United States Patent
Guo et al.

(10) Patent No.: US 12,433,496 B2
(45) Date of Patent: Oct. 7, 2025

(54) VITAL SIGN DETECTION APPARATUS AND SYSTEM AND DATA PROCESSING METHOD

(71) Applicants: NATIONAL UNIVERSITY OF SINGAPORE, Singapore (SG); NATIONAL UNIVERSITY OF SINGAPORE (SUZHOU) RESEARCH INSTITUTE, Jiangsu (CN)

(72) Inventors: Yongxin Guo, Singapore (SG); Bo Wang, Singapore (SG); Zhi Zheng, Singapore (SG)

(73) Assignees: NATIONAL UNIVERSITY OF SINGAPORE, Singapore (SG); NATIONAL UNIVERSITY OF SINGAPORE (SUZHOU) RESEARCH INSTITUTE, Jiangsu (CN)

( * ) Notice: Subject to any disclaimer, the term of this patent is extended or adjusted under 35 U.S.C. 154(b) by 115 days.

(21) Appl. No.: 18/557,403

(22) PCT Filed: Apr. 29, 2022

(86) PCT No.: PCT/SG2022/050266
§ 371 (c)(1),
(2) Date: Oct. 26, 2023

(87) PCT Pub. No.: WO2022/231525
PCT Pub. Date: Nov. 3, 2022

(65) Prior Publication Data
US 2024/0237905 A1   Jul. 18, 2024

(30) Foreign Application Priority Data

| Apr. 29, 2021 | (CN) | 202110474401.0 |
| Apr. 29, 2021 | (CN) | 202110476260.6 |
| Dec. 31, 2021 | (CN) | 202111678411.2 |

(51) Int. Cl.
*A61B 5/021* (2006.01)
*A61B 5/00* (2006.01)
(Continued)

(52) U.S. Cl.
CPC ............ *A61B 5/02108* (2013.01); *A61B 5/05* (2013.01); *A61B 5/7257* (2013.01); *G01S 7/292* (2013.01); *A61B 5/742* (2013.01); *A61B 2562/06* (2013.01)

(58) Field of Classification Search
CPC ..... A61B 5/02108; A61B 5/05; A61B 5/7257; A61B 5/742; A61B 2562/06; G01S 7/292
See application file for complete search history.

(56) References Cited

U.S. PATENT DOCUMENTS

| 2008/0309546 A1* | 12/2008 | Wakayama | G01S 7/292 |
| | | | 342/129 |
| 2015/0257653 A1* | 9/2015 | Hyde | A61B 5/0077 |
| | | | 600/407 |

(Continued)

FOREIGN PATENT DOCUMENTS

| CN | 110584631 A | 12/2019 |
| JP | 2020-192187 A | 12/2020 |

OTHER PUBLICATIONS

Yoshioka, M., et al. "Regression-forests-based Estimation of Blood Pressure using the Pulse Transit Time Obtained by Facial Photoplethysmogram," IEEE 2017 International Joint Conference on Neural Networks. 2017. p. 3248-3253 (Year: 2017).*

*Primary Examiner* — Sean A Frith
(74) *Attorney, Agent, or Firm* — BakerHostetler

(57) ABSTRACT

The vital sign detection device of the present invention includes one or more sensors, which can detect a plurality of vital sign signals of a test subject in a non-contact manner, (Continued)

and output corresponding a plurality of vital sign information, thereby achieving fast and accurate vital sign detection. The invention also relates to a combined multi-functional detection device, which includes a camera, a radar sensor, an infrared sensor and a sensor driving unit, used for measuring vital signs. The invention also provides a non-contact blood pressure measurement method and device. The method includes receiving radar echoes and video signal streams at first and second parts, extracting first and second pulse wave signals therefrom, obtaining a measured pulse wave transit time, matching the measured pulse wave transit time with a reference pulse wave transit time, and obtaining a blood pressure value.

12 Claims, 28 Drawing Sheets

(51) Int. Cl.
*A61B 5/05* (2021.01)
*G01S 7/292* (2006.01)

(56) References Cited

U.S. PATENT DOCUMENTS

| | | | |
|---|---|---|---|
| 2016/0100766 A1* | 4/2016 | Yoshioka | A61B 5/0082 |
| | | | 600/301 |
| 2016/0345845 A1 | 12/2016 | Ravid et al. | |
| 2018/0344193 A1* | 12/2018 | Gui | A61B 5/6898 |
| 2019/0365244 A1* | 12/2019 | Horng | G01S 13/88 |
| 2020/0047055 A1* | 2/2020 | Ward | G06V 10/143 |
| 2020/0146567 A1* | 5/2020 | Dennis | A61B 5/7275 |
| 2021/0059586 A1* | 3/2021 | Marriott | A61B 5/7225 |
| 2022/0257178 A1* | 8/2022 | Höynälä | A61B 5/7289 |
| 2022/0331028 A1* | 10/2022 | Sternitzke | G05D 1/0094 |

* cited by examiner

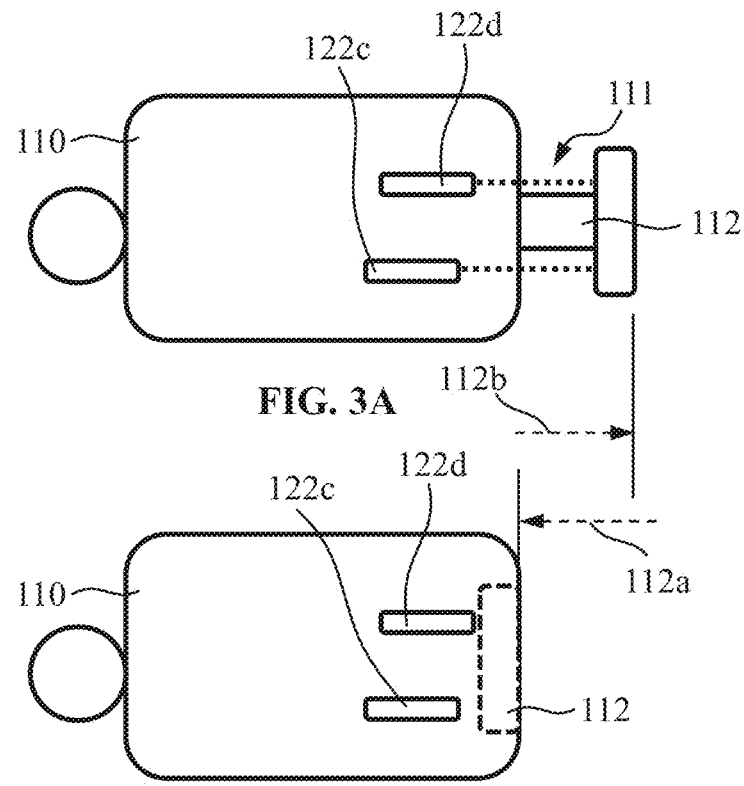
FIG. 3A
FIG. 3B
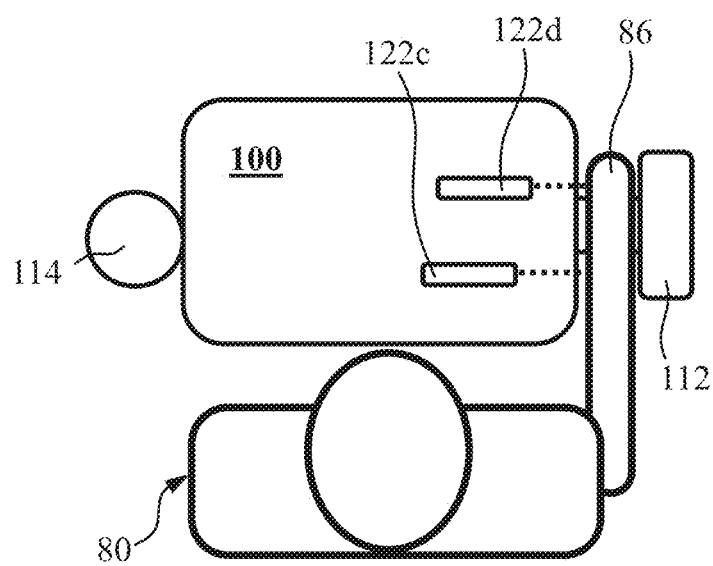
FIG. 3C

VITAL SIGN DETECTION APPARATUS AND SYSTEM AND DATA PROCESSING METHOD

CROSS-REFERENCE TO RELATED APPLICATIONS

The present application is the National Stage Application of International Patent Application No. PCT/SG2022/050266, filed Apr. 29, 2022, which claims priority to Chinese Patent Application No. 202110474401.0, filed Apr. 29, 2021, Chinese Patent Application No. 202110476260.6, filed Apr. 29, 2021, and Chinese Patent Application No. 20211678411.2, filed Dec. 31, 2021.

TECHNICAL FIELD

The present invention relates to health screening and in particular, to a vital sign detection device, system and data processing method.

BACKGROUND

Existing vital sign information acquisition mainly involves medical staff operating screening instruments on the test subjects during testing. As the detection of multiple vital signs, such as blood pressure, heart rate, and respiratory rate requires the detection instrument to be fixed on the respective body parts of the test subject, the existing vital sign detection process is cumbersome and inefficient, and physical contact between the detection equipment and the test subject may cause discomfort to the test subject during the testing process resulting in inaccurate test results. In addition, different vital sign information are to be processed separately using different instruments. When multiple vital signs are to be detected, multiple procedures become necessary to complete all the tests, which are time consuming. In situations where medical staff are unavailable, the detection of some vital signs is limited or cannot be completed.

For example, current blood pressure measurement equipments require the use of cuffs and other components to contact the body surface of the test subject, and to measure blood pressure by compressing the blood vessels of the test subject. Such contact-based blood pressure measurement method has a greater impact on the test subject and is particularly unsuitable for dynamic and continuous blood pressure monitoring during sleep. Blood pressure monitoring based on ECG, hand blood oxygen signal and other physical information require devices such as monitoring electrodes and blood oxygen probes to be positioned on the test subject's body surface. There are major limitations to the effective use of such contact measurements, for example in patients with burn injuries or in the context of the COVID-19 pandemic.

SUMMARY

According to one aspect, the present invention provides a vital sign detection device for measuring vital sign information of a subject in a non-contact manner. The detection device of the present invention includes a main body, a plurality of sensors coupled to the main body, and a controller in data connection with the plurality of sensors. The plurality of sensors are configured to simultaneously detect a plurality of corresponding vital sign signals of a test subject, and the controller is configured to receive the plurality of corresponding vital sign signals from the plurality of sensors, and to provide at least one vital sign information of the test subject based on at least one of the plurality of corresponding vital sign signals received.

According to a preferred solution, the controller is configured to obtain the at least one vital sign information of the test subject based on the plurality of corresponding vital sign signals. For example, among the multiple vital sign signals, there are respiratory signal, heartbeat signal and blood pressure signal. The present solution obtains the respiratory rate and/or heart rate of the test subject in a duration by processing the respiratory signal and/or heartbeat signal, and determining whether the test subject is in a static and suitable state based on the respiratory rate and/or heart rate. The physical condition for vital sign detection, if so, the blood pressure signal detected in the same time period can be determined as the true blood pressure of the test subject. If not, this solution can determine that the blood pressure signal measured during a period when the test subject is in a static physical state suitable for vital sign detection based on the respiratory rate and/or heart rate, and is determined to be corresponding to the test subject. True blood pressure.

According to an alternative embodiment, the controller is configured to obtain the at least one vital sign information of the test subject based on the plurality of corresponding vital sign signals.

According to an alternative embodiment, the controller is configured to obtain a plurality of vital sign information of the test subject based on at least one vital sign signal.

According to another preferred embodiment, the detection device of the present invention further includes a human-machine interaction interface coupled to the controller. The human-machine interaction interface is configured to verify an identity information of the test subject, and to provide the at least one vital sign information corresponding to the identity information of the test subject to the test subject.

According to another preferred embodiment, the detection device of the present invention further includes a driving unit, the main body is installed on the driving unit and coupled to the controller, and the driving unit is configured to carry the main body to move between a plurality of preset detection positions.

According to a further preferred embodiment, the detection device of the present invention further includes a position sensor and a proximity sensor coupled to the controller, wherein the controller is configured to activate the detection device to perform vital signs detection upon the position sensor determining that the detection device reaches any of the plurality of preset detection positions and upon the proximity sensor determining that the test subject is located at any one of the preset detection positions.

According to another preferred embodiment, the detection device of the present invention further includes a communication device coupled to the controller, and the communication device is configured to be communicably connectable with a remote end.

According to yet another preferred embodiment, the detection device of the present invention further includes a support portion movably coupled to the main body, wherein at least one sensor of the plurality of sensors is disposed to face the support portion; the support portion is movable relative to the main body between an open position and a closed position; in the open position, the support portion extends from the main body to form a receiving space between the support portion and the main body, the at least one sensor is configured to have a detection range covering the receiving space; in the closed position, the support portion retracts into the main body to collapse the receiving space.

According to yet another preferred embodiment, the plurality of sensors includes a radar device and a video device; the plurality of corresponding vital sign signals includes a first pulse wave signal and a second pulse wave signal; the controller includes a radar signal processor coupled to the radar device and a video signal processor coupled to the video device; the at least one vital sign information includes a blood pressure value; wherein the radar device is configured to transmit a radar signal to the test subject and to receive a radar echoes from a first part of the test subject, and the radar signal processor is configured to extract the first pulse wave signal from the radar echoes; the video device is configured to receive a video signal from a second part of the test subject, and the video signal processor is configured to extract the second pulse wave signal from the video signal stream; the controller is configured to obtain a measured pulse wave transit time from the first pulse wave signal and the second pulse wave signal, and to match the measured pulse wave transit time with a reference pulse wave transit time to obtain the blood pressure value.

According to yet another preferred embodiment, the radar signal processor is further configured to demodulate in-phase signals and orthogonal signals in the radar echoes to obtain an initial radar signal, and to perform a phase compensation to the initial radar signal to obtain a complete radar signal.

According to yet another preferred embodiment, the detection device of the present invention further includes first filter, the radar signal processor is further configured to transform the complete radar signal from time domain to frequency domain to obtain a highest amplitude corresponding to a reference frequency; the first filter is configured to filter the complete radar signal to obtain the first pulse wave signal, wherein an upper bound frequency of the first filter is configured to vary based on the reference frequency.

According to yet another preferred embodiment, the detection device of the present invention further includes a second filter, and the video signal processor is further configured to: extract an original green channel signal from the video signal stream; remove interference signals from the original green channel signal to obtain a baseline-drift-eliminated green channel signal; set an interval upper bound of the second filter; filter the baseline-drift-eliminated green channel signal with the second filter to obtain the second pulse wave signal, wherein the interval upper bound of the second filter varies based on the reference frequency.

According to yet another preferred embodiment, the detection device of the present invention further includes: a bearing frame having a first surface; a second surface opposite to the first surface; and a window through the first surface and the second surface; the radar device is fixed to a first position on a side of the bearing frame facing the first surface and spaced apart from the bearing frame, the radar device and the bearing frame forming an accommodating space for receiving the test subject on the first surface, the first position is spaced apart from the first part of the test subject such that the radar device transmits radar signals to the test subject and receives radar echoes from the first part of the test subject; the video device is fixed to a second position facing the second surface and spaced apart from the bearing frame, the second position is aligned with a second part of the test subject through the window such that the video device receives the video signal of the second part of the test subject through the window.

According to another aspect, the present invention provides a vital sign detection system, which system includes a controller, a plurality of sensors coupled to the controller, a processor remotely connected to the controller, and a processor coupled to the controller. A human-machine interface for at least one of the controller and the processor. The plurality of sensors is configured to detect a plurality of vital sign signals of a test subject and to transmit the plurality of vital sign signals to the controller. The processor is configured to receive the plurality of vital sign signals from the controller, and to obtain at least one vital sign information based on at least one of the plurality of vital sign signals received, and the human-machine interface is configured to output the at least one vital sign information.

According to another aspect, the present invention provides a vital sign detection data processing method, the method includes receiving a plurality of vital sign signals, the plurality of vital sign signals including a first vital sign signal and a second vital sign signal; determining a detection status of the second vital sign signal based on the first vital sign signal; wherein responsive to determining the detection state of the second vital sign signal satisfying a predetermined state, determining the second vital sign signal to be an actual vital sign information.

According to one embodiment, the present invention provides a combined multi-functional detection device, which includes a camera, a radar sensor, an infrared sensor and a driving unit, the driving unit is coupled to the camera and the radar sensor, the driving unit is configured to align the radar sensor with the chest level of the test subject based on images acquired by the camera, the infrared sensor is aligned with the forehead of the test subject, to perform an optimal non-contact measurements of height, heart rate, respiration, body temperature and blood pressure of the test subject.

According to another embodiment, the present invention provides a combined multi-functional detection device, which includes: a camera, a radar sensor, an infrared sensor, a processor and at least one driving unit. The processor is coupled to the camera and the radar sensor, and the at least one driving unit is coupled to the camera, the radar sensor and the infrared sensor respectively. The at least one driving unit is configured to drive the radar sensor to move to align with the chest of the test subject and collect information for the radar sensor to determine the blood pressure of the test subject in response to instructions sent by the processor, wherein a respective displacement of the radar sensor and the infrared sensor is based on the information collected by the camera.

According to the above-mentioned combined multi-functional detection device, the radar sensor includes an antenna main lobe, and the at least one driving unit is configured to align the antenna main lobe with the chest level of the test subject, and acquire the test subject's respiratory rate and heart rate when the main lobe of the antenna is aligned with the chest level of the test subject.

The combined multi-functional detection device may further include: a processor configured to perform an alignment step, wherein the alignment step includes: obtaining the key joint positions of the test subject based on the non-infrared image information collected by the camera; obtaining the chest level of the test subject; and sending movement instructions to at least one driving unit, to align the radar sensor with the chest level of the test subject.

The combined multi-functional detection device may further include: the processor may be further configured to: periodically collect preliminary information from a detection area through one of: a camera and a radar sensor; determine whether the test subject is in the detection area based on the preliminary information; and when it is determined that the test subject is in the detection area, to activate the vital signs detection process, wherein the vital signs detection process includes a blood pressure measurement process.

The combined multi-functional detection device can be configured such that the blood pressure measurement method includes: obtaining an image information of the reference object from the camera; estimating a distance information of the test subject based on the radar signal; and obtain the height of the test subject based on the image information of the test subject and the image information of the reference object and the distance information.

The combined multi-functional detection device can be configured such that the blood pressure measurement method includes: obtaining a respiratory frequency of the test subject based on a radar signal collected by the radar sensor; obtaining a heart rate waveform of the test subject based on the radar signal; and obtaining an estimate of the blood pressure of test subject based on the height, heart rate waveform and other pre-determined vital sign information.

The processor of the combined multi-functional detection device may be configured to obtain a position of a forehead of a test subject, and measure a forehead temperature of the test subject through the infrared sensor when the infrared sensor and the forehead of the test subject are separated by a predetermined distance.

The processor of the combined multi-functional detection device may be configured to: responsive to determining that there is no test subject with vital signs in the detection area, to continue collecting preliminary information from the detection area every 5 seconds.

The processor of the combined multi-functional detection device may be configured to: upon activating the vital signs detection process, to complete the collection of the vital signs of the test subject within 15 seconds to 30 seconds; and to send the acquired vital signs of the test subject and the estimated blood pressure of the test subject to the remote server.

The processor of the combined multi-functional detection device may be configured to provide a reminder of the physiological detection process status update to the test subject in the detection area.

According to another aspect, the present invention provides a non-contact blood pressure measurement method. The method includes receiving a radar echoes from a first part of a test subject; extracting a first pulse wave signal from the radar echoes; receiving a video signal stream of a second part of the test subject; extracting a second pulse wave signal from the video signal stream; obtaining a measured pulse wave transit time from the first pulse wave signal and the second pulse wave signal; and matching the measured pulse wave transit time with a reference pulse wave transit time to obtain a blood pressure value corresponding to the measured pulse wave transit time.

Preferably, extracting the first pulse wave signal from the radar echoes includes: demodulating in-phase signals and orthogonal signals in the radar echoes to obtain an initial radar signal; performing phase compensation on the initial radar signal to obtain a complete radar signal; performing a first filter filtering on the complete radar signal to obtain the first pulse wave signal.

Preferably, the non-contact blood pressure measurement method of the present invention also includes prior to performing the filtering on the complete radar signal: performing a Fourier transform on the complete radar signal to transform the complete radar signal from time domain to frequency domain to obtain a reference frequency corresponding to a highest amplitude, and setting a first filter interval upper bound for filtering the complete radar signal, wherein the first filter interval upper bound varies based on the reference frequency.

Preferably, extracting the second pulse wave signal from the video signal stream includes: extracting an original green channel signal from the video signal stream; removing interference signals from the original green channel signal to obtain a baseline-drift-eliminated green signal; setting an interval upper bound of the second filter; and filtering the baseline-drift-eliminated green channel through a second filter to obtain the second pulse wave signal, wherein the interval upper bound of the second filter varies based on the reference frequency.

Preferably, removing interference signals from the original green channel signal further includes: extracting a signal strength value of an original green channel; and subtracting from the signal strength value of the original green channel an average value of signal strength values of the green channel.

Preferably, a distance between the first part and a pulse source of the test subject is smaller than a distance between the second part and the pulse source.

According to another aspect, the present invention provides a non-contact blood pressure measurement device. According to one embodiment, the non-contact blood pressure measurement device includes a radar device, a radar signal processor coupled to the radar device, a video device, a video signal processor coupled to the video device, and a data processor coupled to the video signal processor. The radar signal processor is configured to transmit radar signals to the test subject and receive radar echoes from a first part of the test subject. A radar signal processor is configured to extract a first pulse wave signal from the radar echoes. The video device is configured to receive a video signal stream from the second part of the test subject. The video signal processor is configured to extract a second pulse wave signal from the video signal stream. The data processor is configured to obtain a measured pulse wave transit time from the first pulse wave signal and the second pulse wave signal and to match the measured pulse wave transit time with a reference pulse wave transit time to obtain a corresponding blood pressure value.

Preferably, the radar signal processor is further configured to demodulate in-phase signals and orthogonal signals in the radar echoes to obtain an initial radar signal and to perform phase compensation on the initial radar signal to obtain a complete radar signal.

Preferably, the non-contact blood pressure measurement device according to the embodiment of the present invention further includes a first filter and a second filter. The radar signal processor is further configured to transform the complete radar signal from time domain to frequency domain to obtain a reference frequency corresponding to a highest amplitude; the first filter is configured to filter the complete radar signal to obtain the first pulse wave signal, wherein an upper bound frequency of the first filter is configured to vary based on the reference frequency.

Preferably, the video signal processor is further configured to extract an original green channel signal from the video signal stream, remove interference signals from the original green channel signal to obtain a baseline-drift-eliminated green channel signal, and set an interval upper bound of the second filter, and perform a second filter filtering on the baseline-drift-eliminated green channel signal to obtain the second pulse wave signal, wherein the interval upper bound of the second filter varies with the reference frequency.

Preferably, the device further includes a bearing frame. The bearing frame has a first surface; a second surface opposite to the first surface, and a window through the first surface and the second surface; the radar device fixed to a first position on a side of the bearing frame facing the first surface and spaced apart from the bearing frame. The radar device and the bearing frame forming an accommodating space for receiving the test subject on the first surface, the first position is spaced apart from the first part of the test subject such that the radar device transmits radar signals to the test subject and receives radar echoes from the first part of the test subject. The video device is fixed to a second position facing the second surface and spaced apart from the bearing frame, the second position is aligned with a second part of the test subject through the window such that the video device receives the video signal of the second part of the test subject through the window.

According to yet another embodiment, the present invention provides a non-contact blood pressure measurement device and a non-contact blood pressure measurement method based on a single sensor. The non-contact blood pressure measurement device includes a main body, a sensor coupled to the main body, and a controller connected to the sensor data. The sensor is configured to detect the pulse wave signal of the test subject. The controller is configured to receive the pulse wave signal from the sensor and to obtain a blood pressure of the test subject based on the pulse wave signal received.

Preferably, the controller is configured to extract at least one pulse wave characteristic value from the pulse wave signal and to obtain the blood pressure of the test subject based on the at least one pulse wave characteristic value.

Preferably, the at least one pulse wave characteristic value includes: a contraction time proportion (t1/t), a double beat time (t4/t); a Diastolic time ratio (t2/t); a relative height of notch (h2/h1); a relative height of double pulse wave (h3/h1) and a heart rate, corresponding to the pulse wave signal.

Preferably, to obtain the blood pressure value of the test subject according to at least one characteristic value includes: building a random forest model to obtain a reference data model, and obtaining a measured blood pressure value based on a characteristic value of a measured pulse wave.

A non-contact blood pressure measurement method according to this example includes receiving a pulse wave signal of a test subject; extracting at least one pulse wave characteristic value from the pulse wave signal; and obtaining a blood pressure value of the test subject based on the at least one characteristic value.

Preferably, extracting at least one pulse wave characteristic value from the pulse wave signal includes extracting at least one characteristic value of: a contraction time proportion (t1/t), a double beat time (t4/t); a Diastolic time ratio (t2/t); a relative height of notch (h2/h1); a relative height of double pulse wave (h3/h1) and a heart rate.

Preferably, obtaining the blood pressure value of the test subject based on the at least one characteristic value includes: building a random forest model to obtain a reference data model, and obtaining a measured blood pressure value based on a characteristic value of a measured pulse wave.

A detailed description of specific examples is provided below in conjunction with the accompanying drawings to further illustrate the technical solution of the present invention.

BRIEF DESCRIPTION OF THE DRAWINGS

FIG. 3A is a top view of the vital sign detection device as shown in FIG. 2, with a support portion in an open position;

FIG. 3B is a top view of the vital sign detection device shown in FIG. 2, with the support portion in a closed position;

FIG. 3C is a top view of the application scenario of the vital sign detection device shown in FIG. 2.

DETAILED DESCRIPTION

Vital sign information includes basic vital sign information and other vital sign information. Basic vital sign information is an important indicator reflecting human health, which includes body temperature, respiratory rate, heart rate, blood pressure, and blood oxygen concentration, etc. The vital sign detection device according to the present invention includes multiple sensors of different types. The detection instruments, probes, signal acquisition equipment, etc. need not be in direct contact with the body of the test subject, and may undergo detection of multiple vital sign signals from the test subject and output corresponding multiple vital sign information in a non-contact manner separately or simultaneously, thereby achieving fast and accurate vital sign detection as a convenient and comfortable experience for the test subject.

Figure 1:
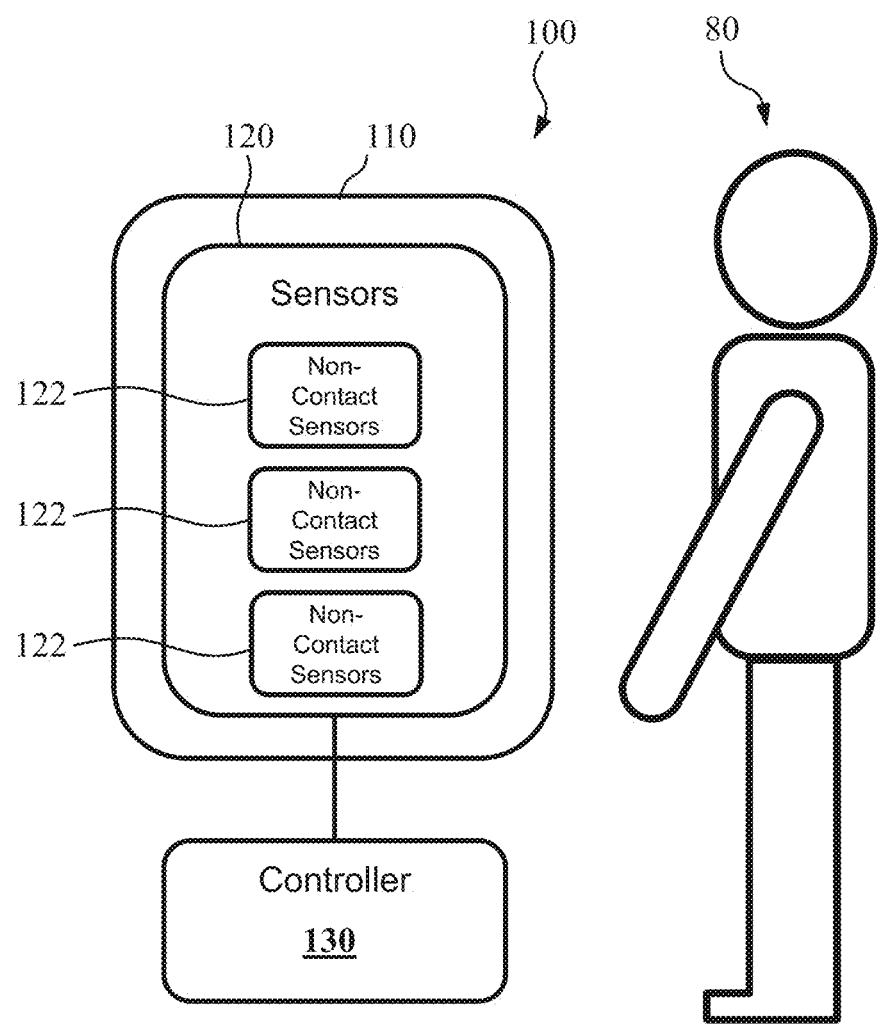
FIG. 1 is a schematic diagram of an architecture and an application scenario of a vital sign detection device according to an embodiment of the present invention.

According to one embodiment, as shown in FIG. 1, the present invention provides a vital sign detection device 100. The vital sign detection device 100 may be configured as a fixed type detection device, such as a detection device installed in a hospital, a nursing home or a health screening center. The vital sign detection device 100 may also be configured as a movable detection device, such as a device maneuverable between a plurality of preset detection positions within a certain zone in a hospital, a nursing home or a health screening center, so as to detect the test subjects at each preset detection position to be tested sequentially, without requiring the test subjects to move. The vital sign detection device 100 may also be configured as a portable detection device, such as a detection device suitable for home use.

Specifically, the vital sign detection device 100 includes a main body 110, a plurality of sensors 120 coupled to the main body 110, and a controller 130 in data connection with the plurality of sensors 120. The controller 130 may be disposed inside the main body 110 or outside the main body 110 and is in data connection with each sensor module 120. Sensors 120 include a plurality of non-contact sensors 122. The plurality of non-contact sensors 122 are configured to independently detect different vital signs, such as respiratory rate, heart rate, blood pressure, etc. The non-contact sensors 122 may also be configured such that two or more of the sensors work together to jointly detect a certain vital sign of the test subject 80. The controller 130 is configured to receive a plurality of vital sign signals from each non-contact sensor 122, and to process and generate corresponding vital sign information according to at least one of the plurality of vital sign signals received.

The vital sign signal is a raw data signal collected directly or indirectly by the sensor, and corresponds to one or more vital signs of the test subject 80. The vital sign signal may be an output directly from a sensor as a result of detection, or may be a signal obtained upon processing an output from a sensor as a result of detection, such as a high signal-to-noise ratio signal after eliminating or reducing the noise of the original detection data. The vital sign signal may be a signal corresponding to a certain vital sign presented in the form of waveform, numerical value, curve, etc. For example, vital sign signals may include respiratory signals, heartbeat signals, pulse wave signals, temperature signals, etc. Corresponding vital sign information may include respiratory rate, heart rate, blood oxygen concentration, blood pressure, etc. The non-contact sensor 122 may acquire multiple signals and values related to the vital sign information synchronously, in real time or simultaneously, thereby reducing the detection time and avoiding the possible discomfort of the test subject 80 caused by contact-based detection which affects the detection accuracy. In addition, the non-contact sensor 122 may also avoid detection errors caused by different body postures of the test subject 80.

The controller 130 may be configured to have a signal processing function, or may transmit the received signal to a remote processor for signal processing. The controller 130 is configured to acquire vital sign signals from multiple non-contact sensors 122 and to further process the vital sign signals using relevant data processing methods, such as algorithms or models, to obtain corresponding vital sign information. Signal data processing, algorithms or models may include but are not limited to: empirical models, machine learning models, deep learning models, etc. Inputs to these models include, but are not limited to, multiple or single data waveforms, multiple or single numerical values. The algorithm or model may also include: signal processing methods such as Butterworth filtering, Empirical Mode Decomposition, and wavelet transform.

Figure 2:
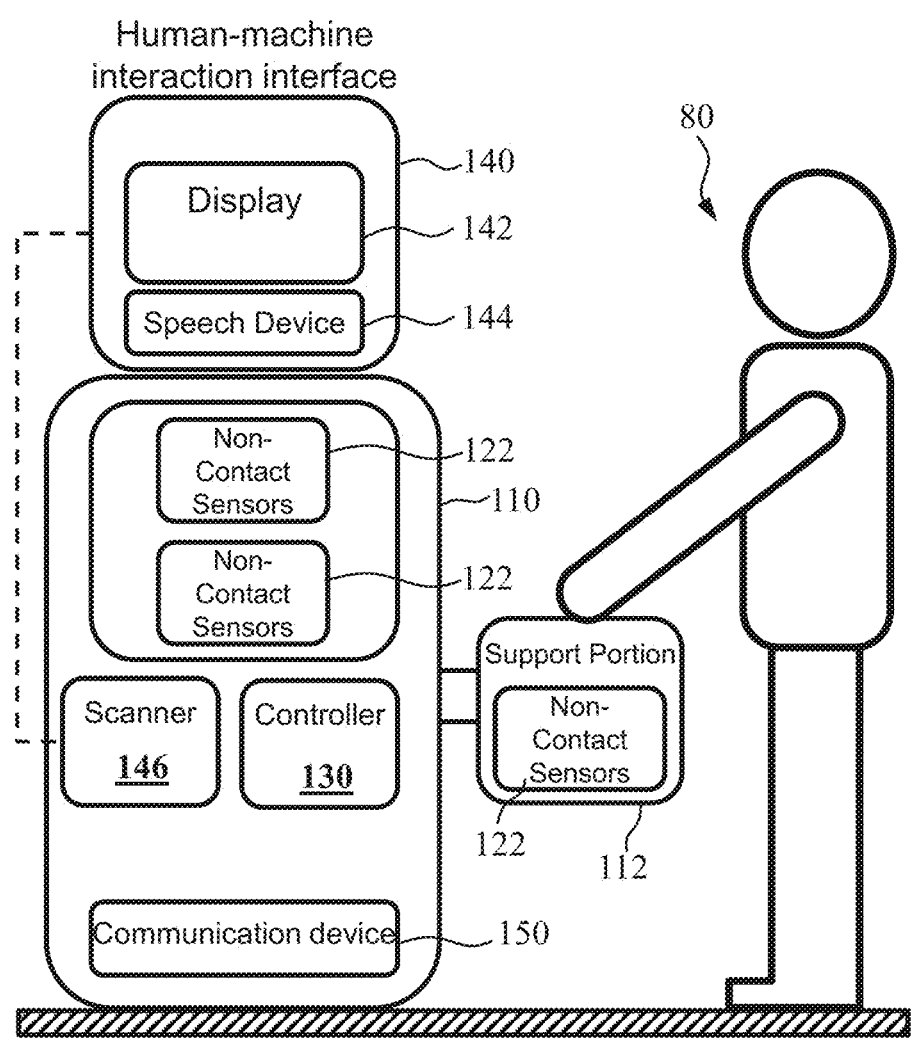
FIG. 2 is a schematic diagram of an architecture and an application scenario of a vital sign detection device according to another embodiment of the present invention.

As shown in FIG. 2, the vital sign detection device 100 according to the present invention may further include a human-machine interaction interface 140. The human-machine interaction interface 140 is configured to include the function of interacting with the test subject 80 during the detection process, such as providing operation step instructions to the test subject 80, detecting and receiving operation instructions from the test subject 80, etc. The human-machine interaction interface 140 is also configured to identify and verify the identity information of the test subject 80, and determine whether the test subject 80 has entered the detection area and is ready, such as verifying the identity of the test subject through face recognition, ID card scanning, etc., and to activate the detection process upon confirming that the test subject meets the preset detection conditions. In one embodiment, the human-machine interaction interface 140 may include a display 142, a speech device 144, and a scanner 146. The test subject 80 is prompted and guided through the display 142 or the speech device 144 to maintain the distance, body posture, and breathing state required for the detection. For example, the test subject 80 is prompted to maintain a static posture and steady breathing state for 15 seconds to 30 seconds before the test begins, this to meet the detection requirements of the plurality of non-contact sensors 122. In addition, the display 142 may also be configured to output the detection results of the test subject 80, for example, by displaying and/or printing the detection results of the test subject 80, and/or real-time vital sign information.

According to another embodiment, the vital signs detection device 100 of the present invention further includes a support portion 112 movably coupled to the main body 110, wherein one or more sensors among the plurality of sensors 122, as examples, are hand-capturing camera 122c, infrared sensor 122d, etc. for collecting data from the palm and wrist. Sensors such as the hand-capturing camera 122c and the infrared sensor 122d are configured facing the support portion 112. The support portion 112 is moveable relative to the main body 110 between an open position 112b and a closed position 112a. In the open position 112b, the support portion 112 extends from the main body 110 to form a receiving space 111 between the support portion 112 and the main body 110. The hand-capturing camera 122c, the infrared sensor 122d, etc. are configured such that the detection ranges cover the receiving space 111. In the closed position 112a, the support portion 112 retracts into the main body 110 to collapse the receiving space 111, such that the vital sign detection device 100 is compact in the non-use state, and the support portion 112 covers and protects the hand-capturing camera 122c and the infrared sensor 122d.

The support portion 112 may support a certain body part of the test subject 80 according to the detection requirements, such as the palm 86 of the test subject 80. During the detection process, the support portion 112 is located in the open position 112b, and the palm of the test subject 80 is placed in the receiving space 111 and supported by the support portion 112, such that the support portion 112 assists in keeping the hand in a relatively stationary state relative to the main body 110. At the same time, the palm of the test subject 80 faces the hand-capturing camera 122c and the infrared sensor 122d, such that the hand camera 122c, the infrared sensor 122d, etc. may collect vital sign signals of the hand. The main body 110 may also include a storage rack 114 for placing auxiliary supplies required for testing, such as disinfectant containers.

The vital sign detection device 100 may further include a communication device 150 coupled to the controller 130. The communication device 150 is configured to be in data connection with a remote end, such as through wireless communication data connection, to transmit the original detection data received by the controller 130 from each sensor to the cloud or a remote end, such as a data processing terminal of a medical staff, to interpret and analyze the original detection data, and to obtain and present vital sign test results. In one application scenario, the test subject 80, as a home user, may transmit vital sign information to medical staff for diagnosis through the communication device 150.

Figure 4A:
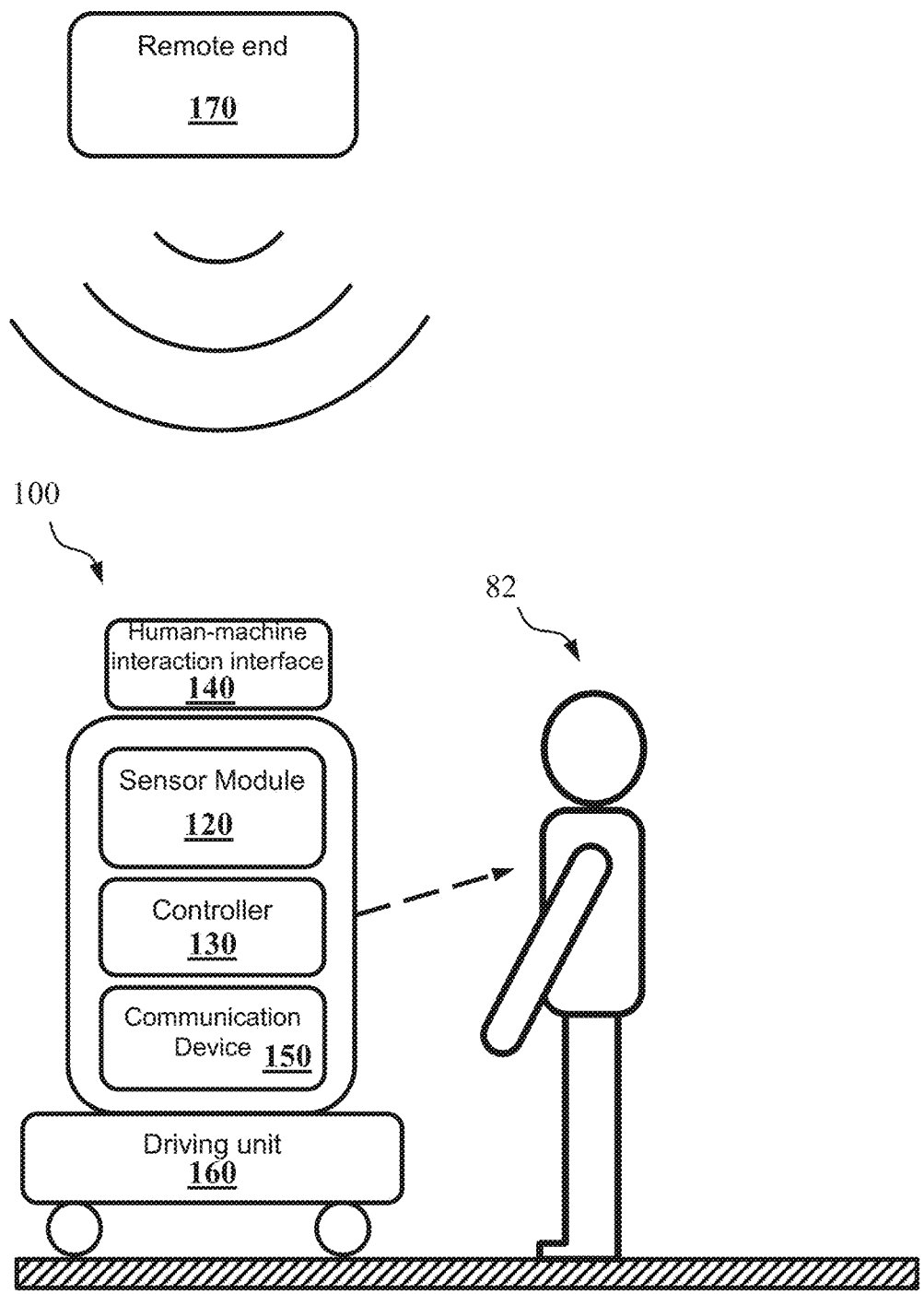
FIGS. 4A, 4B and 4C are schematic diagrams of an architecture and an application scenario of a vital sign detection device according to yet another embodiment of the present invention.
Figure 4B:
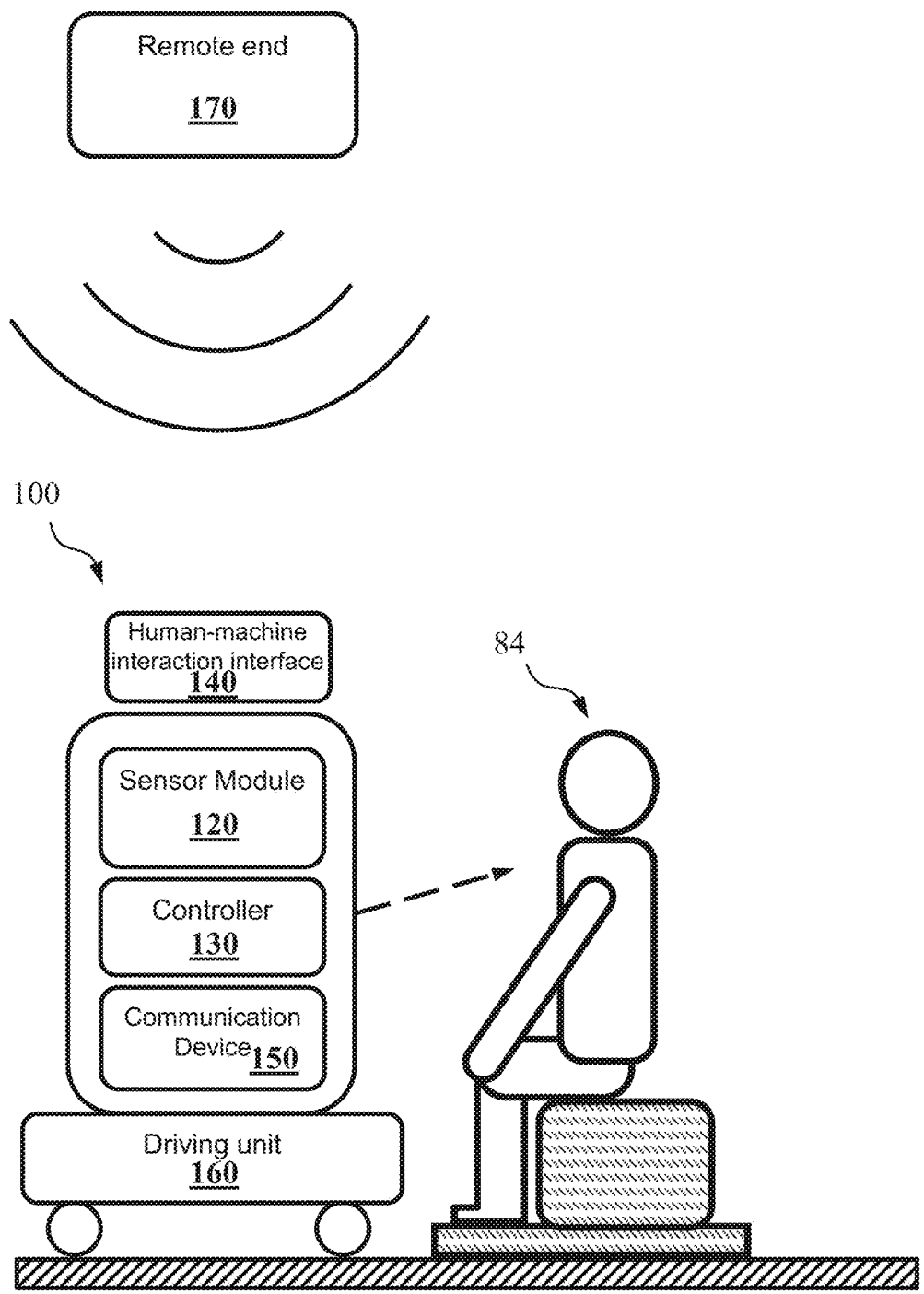

FIGS. 4A and 4B illustrate another embodiment of the vital sign detection device 100. The vital sign detection device 100 further includes a driving unit 160 on which the main body 110 is supported and installed driving unit, and the driving unit 160 is coupled to the controller 130. The driving unit 160 is configured to carry the main body 110 to move between a plurality of preset detection positions. The driving unit 160 may be a mobile base or a mobile robot, for example. The controller 130 may drive the main body 110 to move within a preset range by controlling the driving unit 160 for continuously detecting multiple test subjects 82/84 in different positions, for example, for detection of test subjects with limited mobility, and for obtaining vital sign information of the test subject 82 in a standing posture or the test subject 84 in a sitting posture.

Figure 4C:
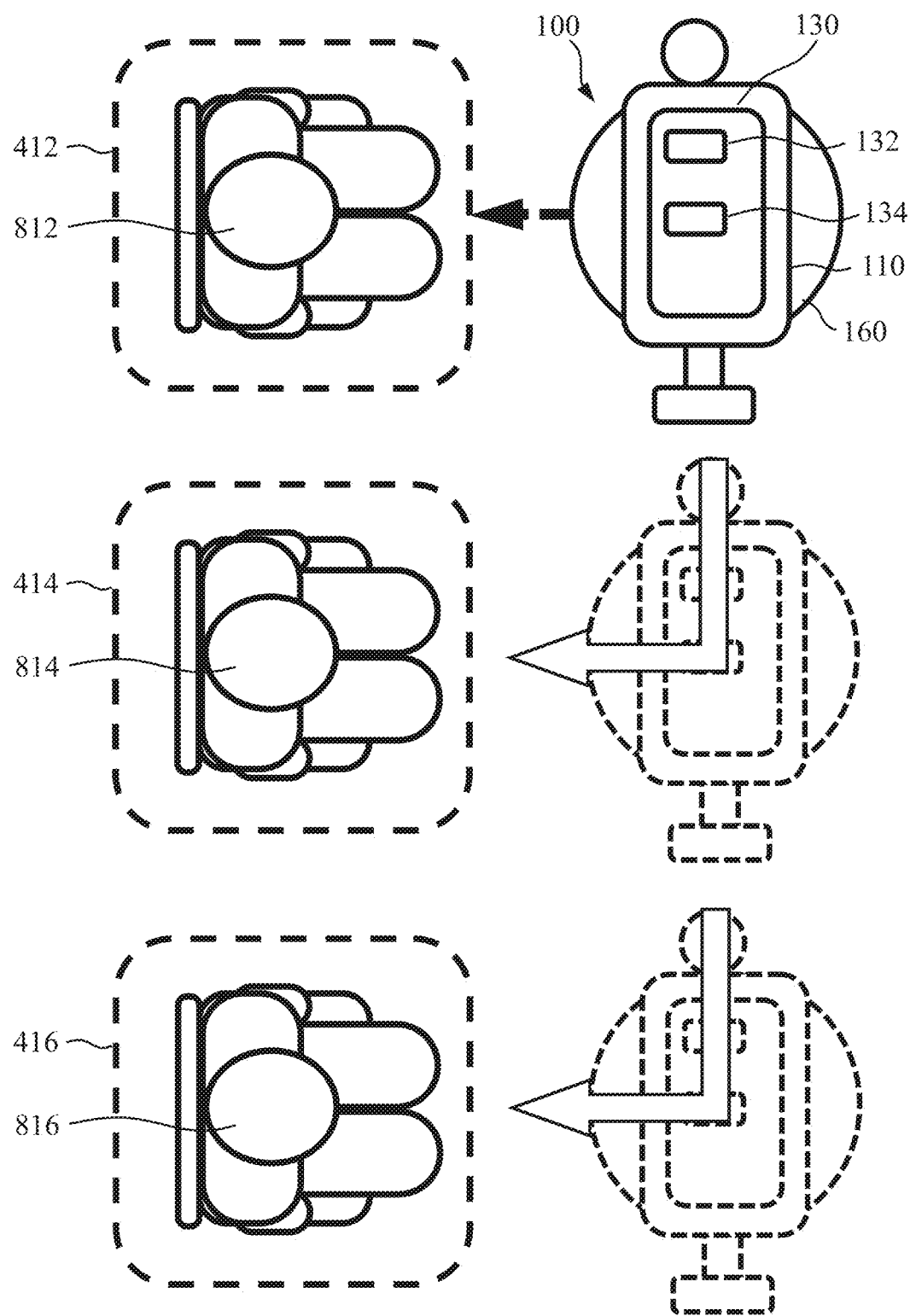

As shown in FIG. 4C, the vital sign detection device 100 according to the present invention may further include a position sensor 132 and a proximity sensor 134 coupled to the controller 130. The controller 130 is configured such that when the position sensor 132 determines that the detection device reaches any one of the plurality of preset detection positions 412, 414, 416, such as the first preset detection position 412, and the proximity sensor 134 determines that the first test subject 812 is positioned at the first preset detection position 412, the detection device is activated to conduct vital sign detection on the first test subject 812. The controller 130 may be further configured to activate the driving unit 160 upon completing the detection of the first test subject 812, to move the detection device 100 towards the second preset detection position 414. When the position sensor 132 determines that the detection device 100 has arrived at the second preset detection position 414, and the proximity sensor 134 determines that the second test subject 814 is positioned at the second preset detection position 414, the detection device is activated to conduct vital sign detection on the second test subject 814. The detection device 100 may detect the first, second and third test subjects 812, 814 and 816 at the first, second and third preset detection positions 412, 414 and 416 sequentially in the above-illustrated manner.

The vital sign detection device 100 may also include a navigation system and a face recognition device combined with the human-machine interaction interface 140, for accurate positioning in front of the test subject 82/84 for conducting detection. In addition, the driving unit 160 can also be controlled from the remote end 170 through the communication device 150 to move the detection device 100 to different test subjects 812, 814, and 816 sequentially. In addition, the identity information of the test subject may also be sent from the remote end 170 to the controller 130 through the communication device 150, and based on the identity information, the controller 130 may move the detection device 100 to the test subject that matches the identity information for detection.

Figure 5:
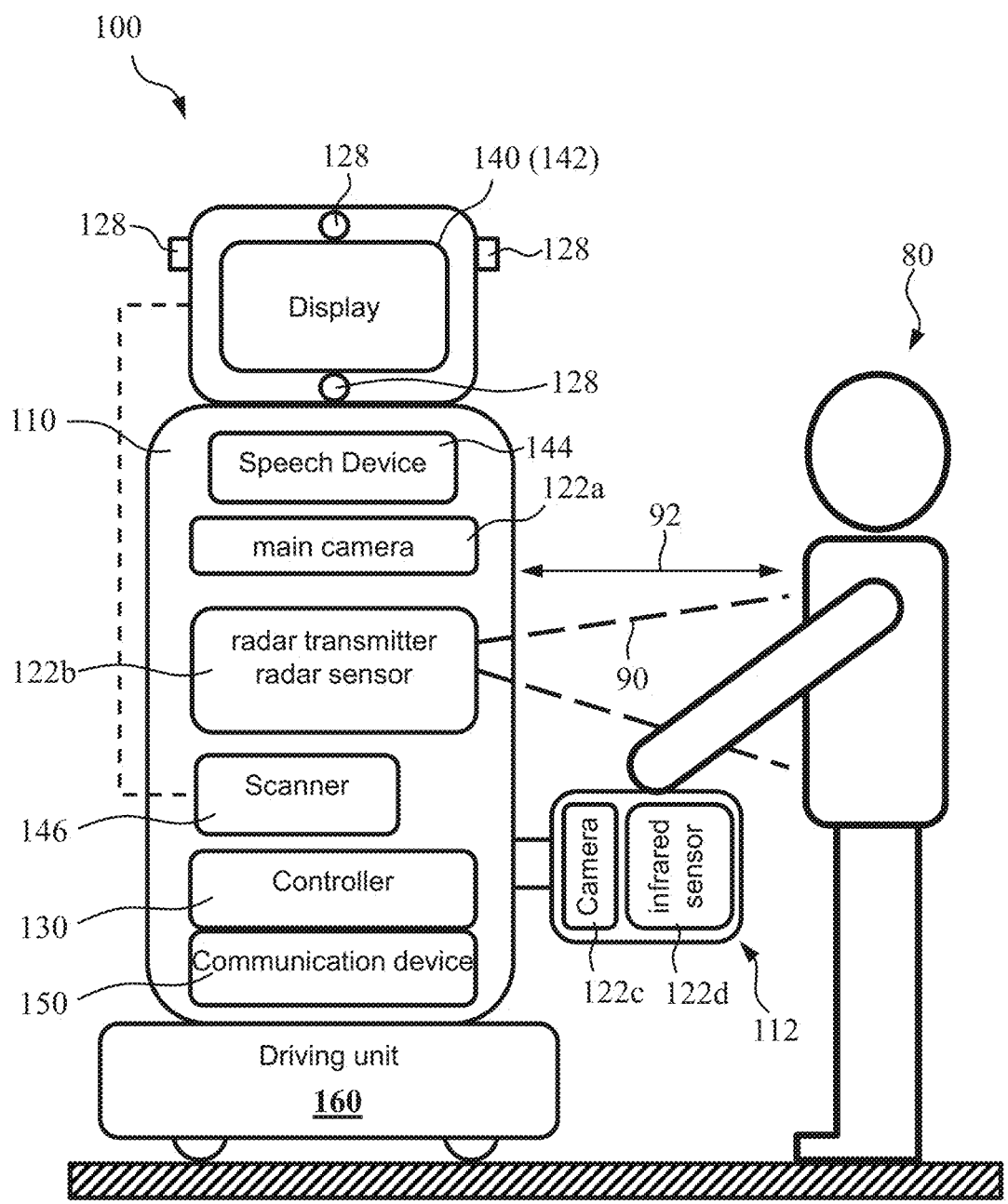
FIG. 5 is a schematic diagram of an architecture and an application scenario of a vital signs detection device according to a specific example of the present invention.

FIG. 5 shows a specific example of the vital sign detection device 100. The vital sign detection device 100 includes a main body 110, a plurality of different types of non-contact sensors 122a/122b/122c/122d coupled to the main body 110, a controller 130, a human-machine interaction interface 140, a communication device 150, and a mobile device 160. The main body 110 is provided with a shell and a support portion 112, and the support portion 112 is used to support the palm of the test subject 80. The plurality of non-contact sensors 122a/122b/122c/122d may respectively be the main camera 122a and the radar sensor 122b provided on the main body 110, as well as the hand-capturing camera 122c and the infrared sensor 122d provided on the support portion 112. There is a spacing 92 between the test subject 80 and the vital sign detection device 100. The main camera 122a is used to capture a facial image of the test subject 80 for identity verification through facial recognition. The radar sensor 122b is configured to detect the breathing, heartbeat and other vital sign signals of the test subject 80 through the radar signal 90. The hand-capturing camera 122c is configured to capture a video signal stream of the palm and/or the wrist of the test subject 80 to obtain a pulse signal for detecting the palm or wrist of the test subject 80. The infrared sensor 122d is configured to detect the hand temperature signal of the test subject 80.

The human-machine interaction interface 140 may include a display 142, a speech device 144, and a scanner 146. The speech device 144 may include functions such as speech recognition, natural language processing, and voice question answering. The human-machine interaction interface 140 interacts with the test subject 80 through the mutual use of the display 142 and the speech device 144. At least one other vital sign information of the test subject may also be obtained through interaction with the test subject, such as the test subject's vision, hearing, reaction ability, etc.

Figure 6:
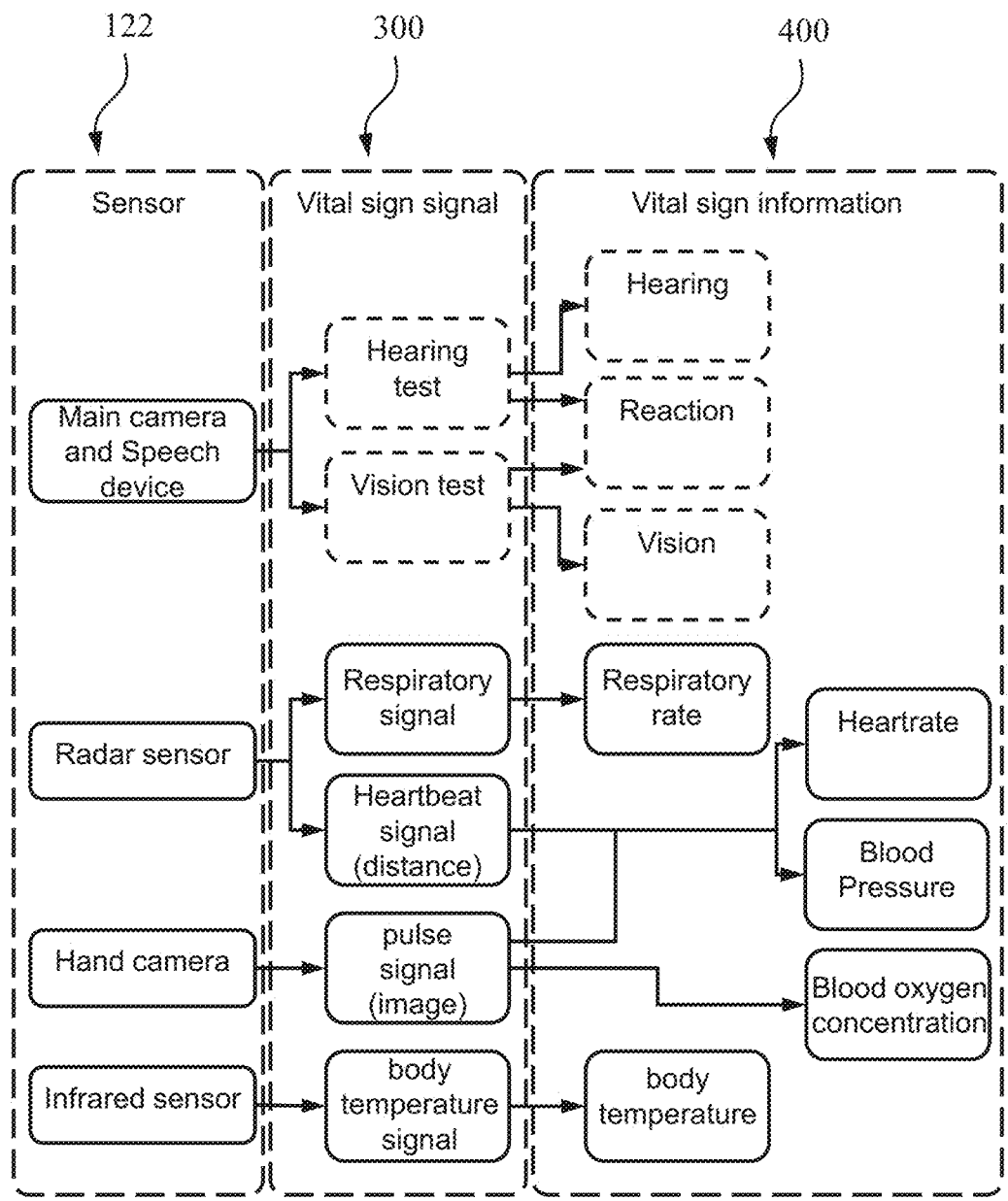
FIG. 6 is a flow chart of a vital sign signals and data processing measured by the vital sign detection device shown in FIG. 5.

As shown in FIG. 6, according to an embodiment of the present invention, the controller may process and obtain corresponding vital sign information 400 according to one or more vital sign signals 300. The vital sign detection device 100 may obtain the vital sign signal 300 such as a breathing signal and a heartbeat signal (distance signal) using the radar sensor 122b. One sensor 122 may measure multiple vital sign signals 300. Concurrently, a pulse signal (image signal) is obtained using the hand-capturing camera 122c. The heartbeat signal corresponds to the signal at a chest level of test subject 80. The pulse signal corresponds to the hand image signal of the test subject 80. Multiple different vital sign signals 300 may correspond to the same vital sign information 400 of the test subject 80. The multiple different vital sign signals 300 may be signals in different forms, such as distance signals and image signals.

After receiving multiple vital sign signals 300 measured at the same time, the controller may process the vital sign signals 300 sequentially to obtain corresponding vital sign information 400. For example, the controller 130 receives and processes the respiratory signal to obtain the respiratory rate and body temperature of the test subject 80. The controller 130 may also use a combination of multiple vital sign signals 300 for processing to obtain a single vital sign information of the test subject 80. For example, a machine learning model is used to process a combination of a heartbeat signal and a pulse signal to obtain the blood pressure of the test subject 80. In addition, the controller 130 may also obtain the blood pressure and blood oxygen concentration of the test subject 80 based on the same vital sign signal 300, such as a pulse signal.

In some embodiments, the controller 130 may perform comparison or signal processing on multiple different vital sign signals 300, such as heartbeat signals and pulse signals, to improve the reliability of measurement results of the same vital sign information (such as heart rate) of the test subject. The controller 130 may also obtain the blood pressure of the test subject 80 through the heartbeat signal, the pulse signal, or the phase shift parameter between the heartbeat signal and the pulse signal. In addition, the measured frequency of the pulse signal may also be used as the intermediate frequency for a signal filter, and the filter may be used to remove noise in the heartbeat signal and improve the signal-to-noise ratio of the heartbeat signal. On the contrary, the measured frequency of the heartbeat signal may be used as the intermediate frequency of a filter, and the filter may be used to remove the noise in the pulse signal and improve the signal-to-noise ratio of the pulse signal. Independent sensors, such as radar or cameras, may detect and estimate blood pressure. Simultaneously using multiple different types of sensors such as radars and cameras at the same time may detect and estimate the blood pressure more accurately.

Table 1 below shows a comparison of vital sign information measured by a vital sign detection device according to an embodiment of the present invention and an existing contact sensor. As shown in Table 1, the deviation between the vital signs information measured by the non-contact sensor of the detection device of the present invention and the detection results of the existing contact-type detection device is smaller than the error in the detection results of the existing contact-type detection device between different time points. Therefore, the detection device may accurately estimate and obtain the vital sign information of the test subject.

TABLE 1

Comparison between the vital sign detection device of the present invention and the contact-type sensor

| Vital sign information | Detection device of the present invention | Contact-type sensor |
|---|---|---|
| Heart rate | 69.5 bpm | 67 bpm |
| Respiratory rate | 15.2 bpm | — |
| Blood pressure (systolic blood pressure) | 109 mmHg | 118 mmHg |
| Blood pressure (diastolic blood pressure) | 57 mmHg | 52 mmHg |
| Blood oxygen (SpO2) | 99% | 99% |
| Body temperature | 36.3 | 36.6 |

In some embodiments, the vital sign detection device 100 may further include multiple cameras 128 disposed facing different directions. The camera 128 may be arranged to have a 360-degrees viewing angle and may be used to detect the surrounding environment. Alternatively or additionally, in applications with privacy considerations, the vital signs detection device 100 may use a radar sensor or a radar sensor array for detecting the surrounding environment, for example, the vital signs detection device 100 may detect the falls of surrounding pedestrians or people within and near the detection area, or detect the falls of people within and near the detection area, and to provide early warning of possible fall accidents, and to send an alert upon detecting the occurrence of falls. Therefore, the vital sign detection device 100 according to the present invention may use a radar sensor array or a wide-angle camera to provide early warning and alarm for falls through posture recognition technologies such as time-frequency analysis, video analysis, and machine learning.

Figure 7:
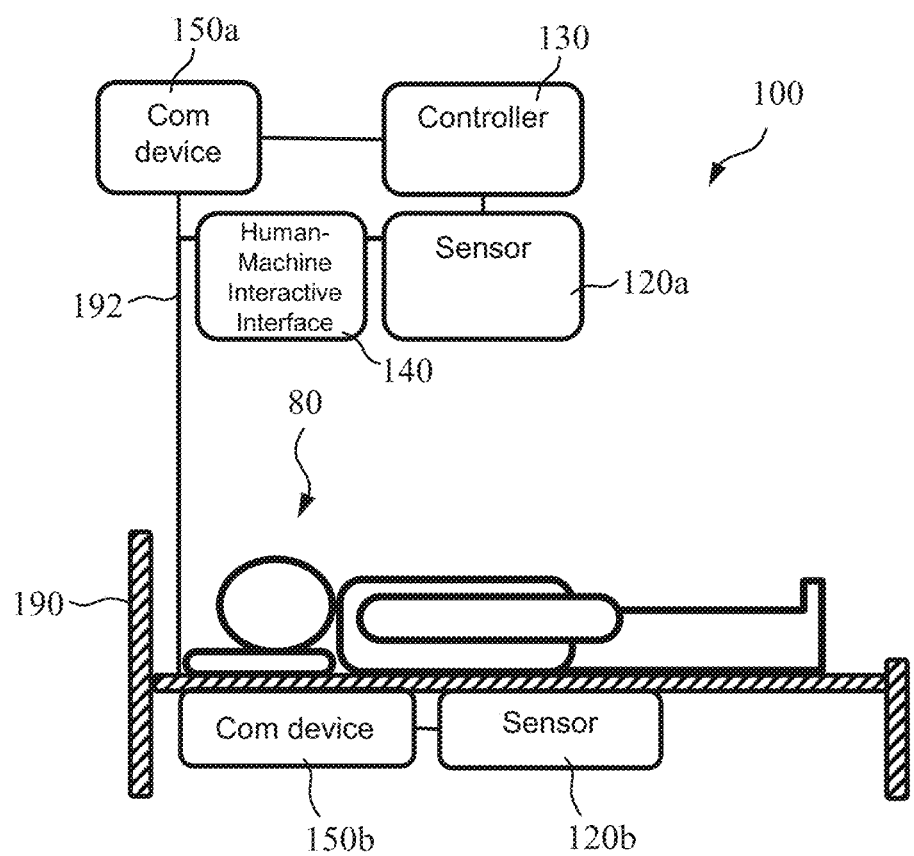
FIG. 7 is a schematic diagram of an architecture and an application scenario of a vital sign detection device according to still another embodiment of the present invention.

According to another embodiment, as shown in the vital sign detection device 100 of the present invention in FIG. 7, the test subject 80 is in a supine position on the detection bed 190. The vital sign detection device 100 may include a plurality of sensors 120a/120b fixed on the detection bed 190 and a plurality of corresponding communication devices 150a/150b. The sensor 120a is configured spaced apart from the sensor 120b. For example, the sensor 120a may be disposed on a fixed frame 192, and the sensor 120b may be coupled to the detection bed 190. Sensors 120a/120b are respectively in data connection with the controller 130. The sensor 120*b* may communicate wirelessly through the communication devices 150*a*, 150*b* to transmit data to the controller 130.

Figure 8:
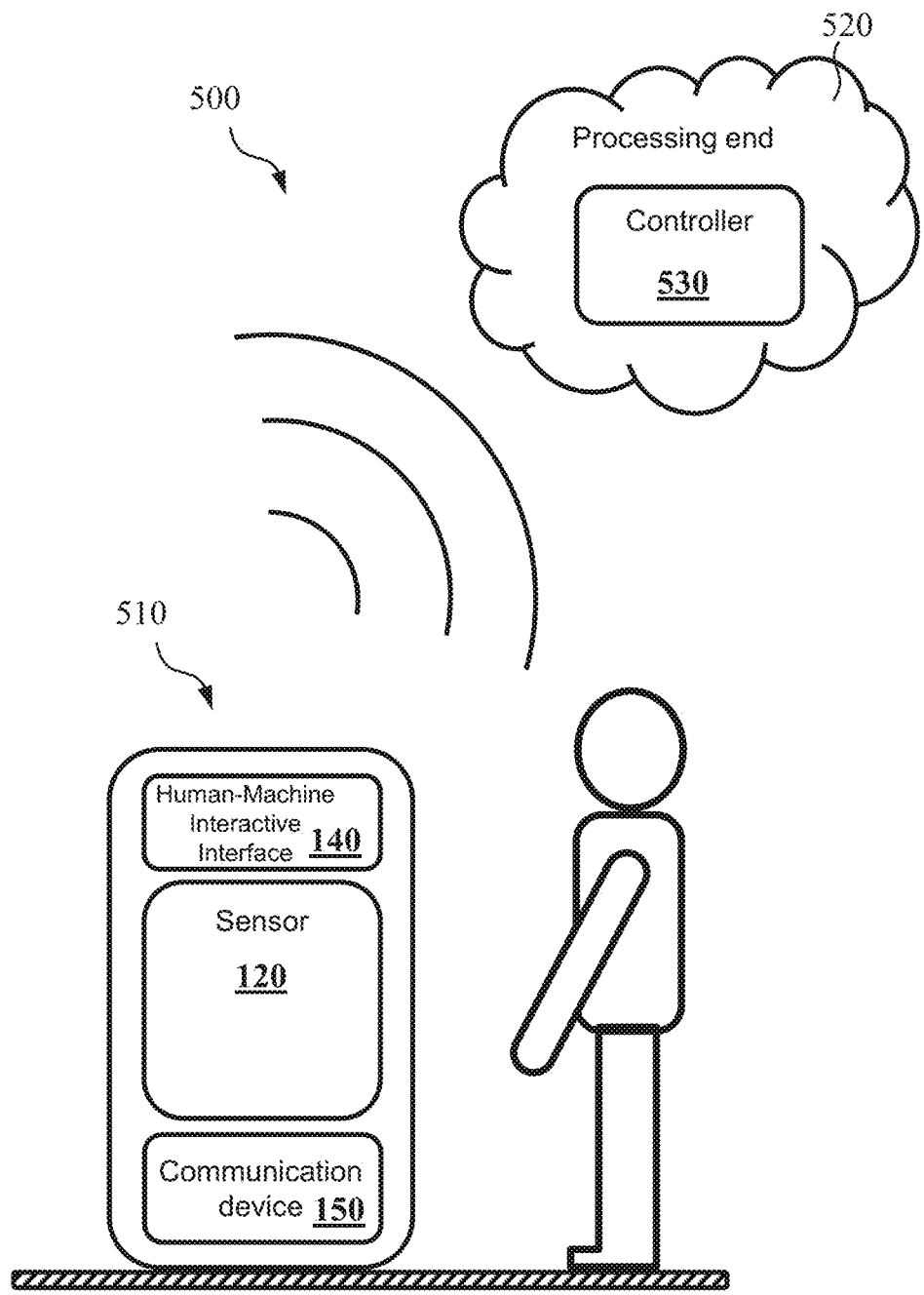
FIG. 8 is a schematic diagram of a vital signs detection system and an application scenario according to an embodiment of the present invention.

FIG. 8 illustrates a vital sign detection system 500 according to one embodiment of the invention. The vital sign detection system 500 includes a detection end 510 and a processing end 520. The detection end 510 may include a sensor 120, which may be used to measure and collect multiple vital sign signals of the test subject 80, and to transmit the multiple vital sign signals to the processing end 520 using the communication device 150. The detection terminal 510 also includes a human-machine interaction interface 140 for interacting with the test subject 80. The processing end 520 may be configured as a cloud end or an information processing end, which is remote from the detection end 510 and the test subject 80. The processing end 520 includes a controller 530, the controller 530 is configured to receive a plurality of vital sign signals simultaneously measured from the test subject 80, and to obtain at least one of vital sign information of the test subject 80 based on at least one of the plurality of vital sign signals received.

Figure 9:
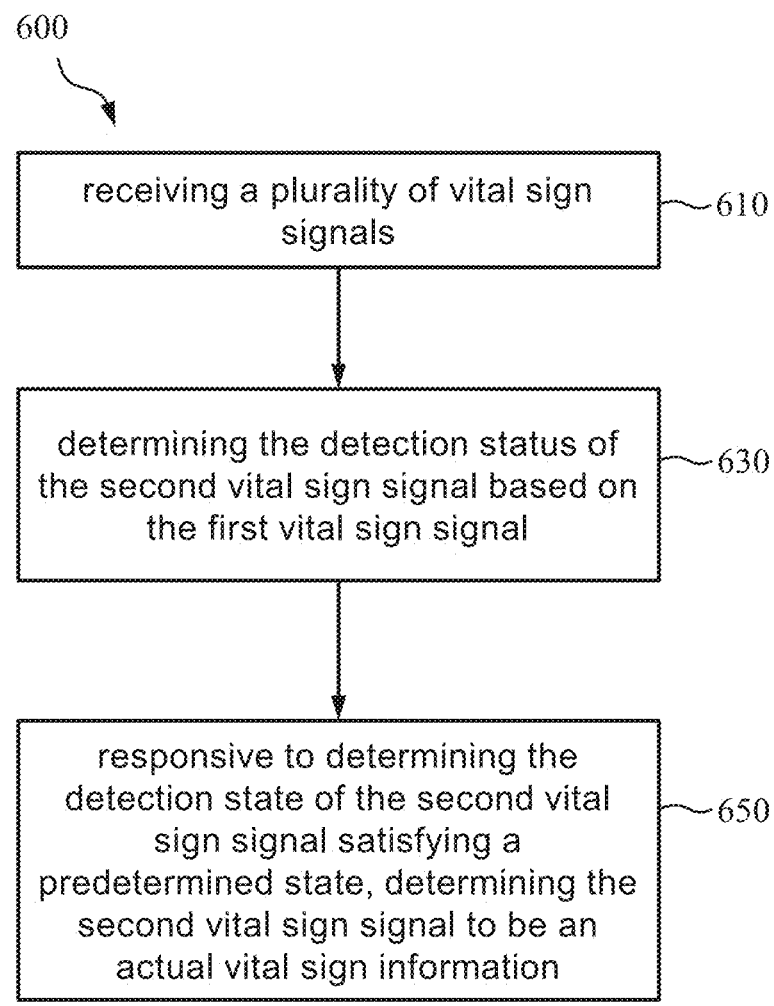
FIG. 9 is a flow chart of a data processing method according to an embodiment of the present invention.
Figure 10:
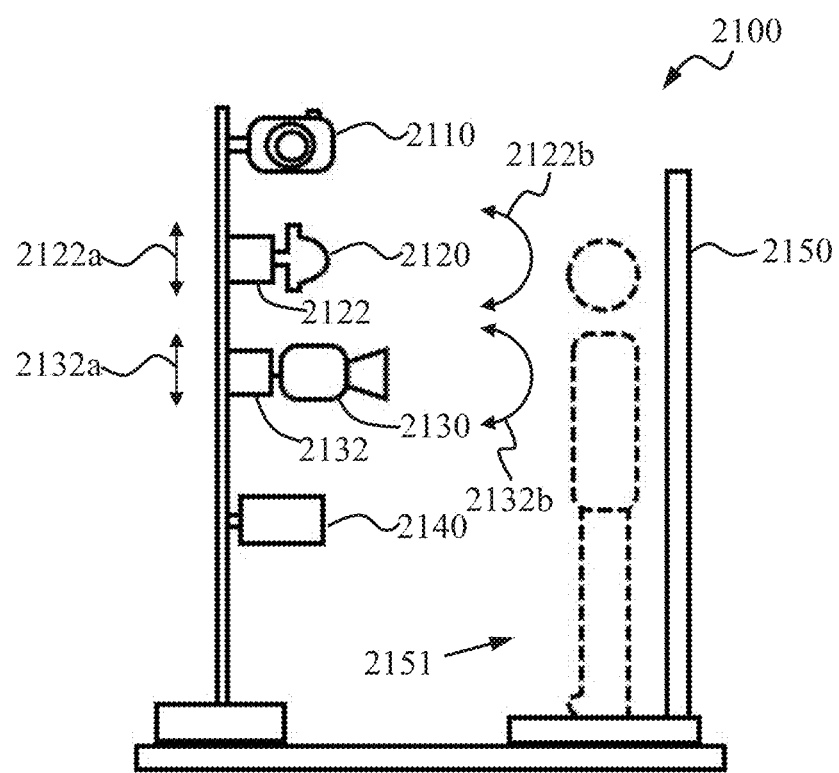
FIG. 10 is a schematic diagram of a combined multi-functional detection device according to one embodiment of the present invention.

FIG. 9 shows a vital sign detection method 600 according to one embodiment of the present invention. Method 600 includes: at step 610, receiving a plurality of vital sign signals, wherein the plurality of vital sign signals include a first vital sign signal and a second vital sign signal; at step 630, determining a detection status of the second vital sign signal based on the first vital sign signal and at step 650, responsive to determining the detection state of the second vital sign signal satisfying a predetermined state, determining the second vital sign signal to be an actual vital sign information FIG. 10 schematically shows a combined multi-functional detection device 2100 for measuring vital sign information of a test subject according to yet another embodiment of the present invention. The combined multi-functional detection device 2100 includes a variety of non-contact sensors including a camera 2110, an infrared sensor 2120, and a radar sensor 2130. The combined multi-functional detection device 2100 includes a processor 2140 coupled to each sensor respectively.

The combined multi-functional detection device includes at least one driving unit. In one example, each driving unit is coupled to at least one of: a camera, a radar sensor, and an infrared sensor. The driving unit may be configured as a pneumatic driving unit, an electric driving unit, or a hydraulic driving unit. The driving unit may be set up to receive and execute instructions from the processor. The driving unit may include infrared sensor driving units and radar sensor driving units. The driving unit may be set up to drive the infrared sensor and radar sensor to any vertical position and to point at any angle within the horizontal plane. For example, the combined multi-functional detection device may include an infrared sensor driving unit 2122 coupled to the infrared sensor and the processor. The infrared sensor driving unit is configured to adjust the physical position and/or other physical settings of the infrared sensor based on instructions provided by the processor, such that there is a predetermined distance between the infrared sensor and the test subject. In another example, the combined multi-functional detection device may include a radar sensor driving unit 2132 coupled to the radar sensor and the processor. The radar sensor driving unit is configured to adjust the physical position and/or other physical settings of the radar sensor based on instructions provided by the processor, such that the radar sensor is aligned with the test subject.

The combined multi-functional detection device includes a reference object 2150. In one example, the reference object may be configured as a length scale or an object with a predetermined length. The reference object may be configured within the detection area or adjacent to the detection area, and within a field of view of the camera. The combined multi-functional detection device may be configured to define a detection area 2151, wherein the camera and the reference object are configured such that when the test subject is located in the detection area, images acquired by the camera show that the reference object is located behind or beside the test subject, with no contact required between the reference object and test subject.

Figure 11:
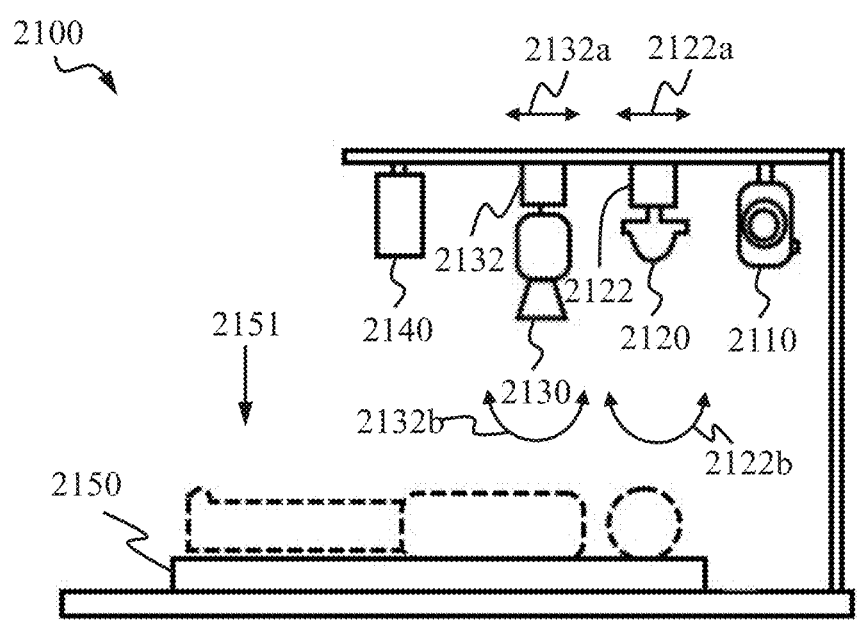
FIG. 11 is a schematic diagram of a combined multi-functional detection device according to another embodiment of the present invention.
Figure 12:
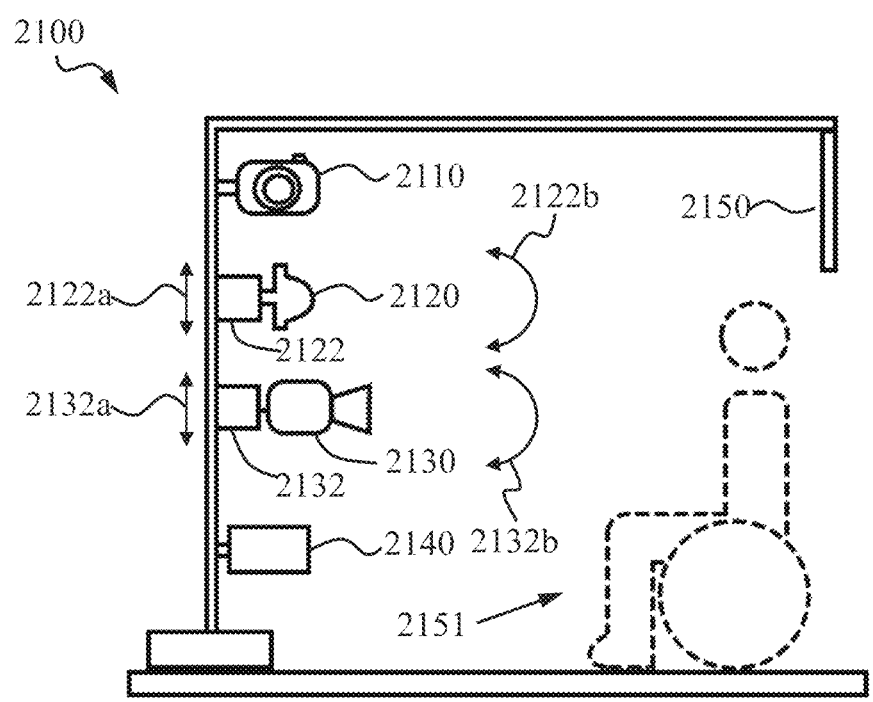
FIG. 12 is a schematic diagram of a combined multi-functional detection device according to another embodiment of the present invention.

In addition to the test subject undergoing detection in a standing posture as shown in FIG. 10, the combined multi-functional detection device according to the present invention may also be utilized in other scenarios. In another example such as one shown in FIG. 11, the test subject may also be in a supine posture. In another example, as shown in FIG. 12, the test subject may also be in a sitting posture. The detection device may be configured as a fixed detection station or a movable device. In one example, the combined multi-functional detection device is configured to provide an entrance for the test subject to enter the detection area, and an exit for the test subject to leave the detection area, wherein the entrance and the exit may be a shared entrance and exit. Preferably, the entrance and the exit are spaced apart from each other. The combined multi-functional detection device is configured to allow the test subject to enter a designated detection area through the entrance and to stand in the designated detection area. As shown in FIG. 10, the combined multi-functional detection device may be configured such that the designated detection area allows a person to walk into the detection area, to stand in the detection area to receive detection, and then to leave the detection area. As shown in FIG. 12, the combined multi-functional detection device may be configured such that the designated detection area allows a person to enter the detection area in a wheelchair, to be positioned in the detection area to receive detection, and then to leave the detection area. The detection area may be defined by the field of view of the camera, and a physical structure may be used to define a preferred position of the test subject when undergoing detection. The vital signs detection process is completely non-contact.

Figure 13:
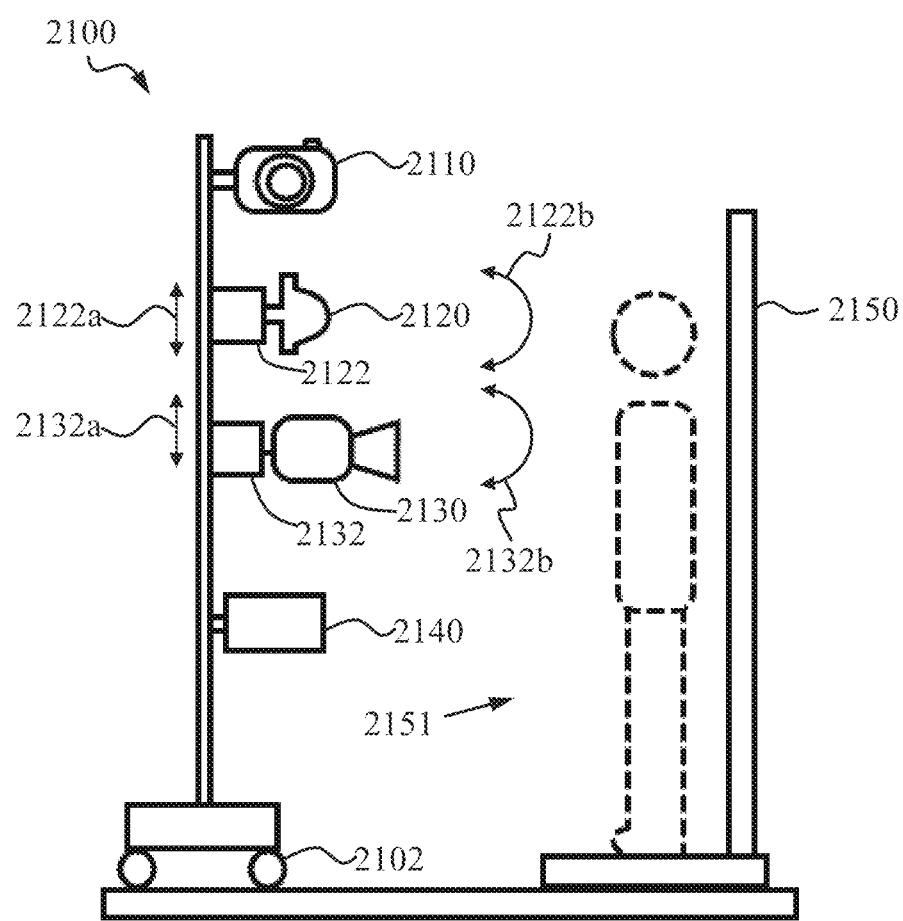
FIG. 13 is a schematic diagram of a combined multi-functional detection device according to another embodiment of the present invention.

As shown in FIG. 13, the combined multi-functional detection device may also be equipped with a movable component 2102, such that the combined multi-functional detection device may be moved as needed, that is, the detection area may be movable. The combined multi-functional detection device may provide a medical detection platform in a ward for a combined multi-functional health information detection at a fixed detection platform site, and may also operable as a mobile or movable medical information detection robot platform.

In one example, the camera may be configured as a digital camera or an analog camera, the image sensor of the camera may be configured as a charge-coupled device sensor or a complementary metal oxide semiconductor sensor, and the lens of the camera may be configured as a plastic lens or a glass lens. In addition, the camera may be rotated over certain angles, such as 320 degrees left and right, 60 degrees up and down, and may collect image information from the detection area, including photo information and video information. The camera may be configured to send the image information captured to the processor for the image information to be further processed.

In one example, the radar sensor may be configured as a mechanically scanning antenna, an electrically scanning antenna, or an electromechanically scanning antenna. Radar sensors may send and collect radar signals. The radar sensor may be installed on the driving unit, and the driving unit may adjust a horizontal position, a vertical position, and an angle of the radar sensor, and aim the radar sensor at a chest level of the test subject based on the image information collected by the camera. The radar sensor may include an antenna main lobe, and the driving unit may direct the antenna main lobe towards the chest level of the test subject. The radar signal collected by the radar sensor may be sent to the processor.

In one example, the infrared sensor may be configured as an infrared thermal sensor or a quantum infrared sensor. Infrared sensors may be defined as fully automatic infrared body temperature detectors or infrared thermal imaging cameras. The operating wavelength of the infrared sensor may be set from 3 microns to 5 microns, or from 8 microns to 12 microns. The photosensitive material of the infrared sensor may be lead sulfide, lead selenide, indium telluride, lead tin telluride, mercury cadmium telluride, doped germanium or doped silicon, etc. The infrared sensor may be configured to detect the body temperature of the test subject based on exposed body parts of the test subject, such as the auricle or the forehead. The infrared sensor is coupled to the processor, and the processor may obtain the body temperature of the test subject measured by the infrared sensor, wherein the infrared sensor is configured to detect the body temperature of the test subject based on a certain body part of the test subject.

The combined multi-functional detection device includes a processor. The processor is coupled to each sensor of the combined multi-functional detection device, which includes a variety of sensors. The processor is configured to obtain information collected by each sensor separately. The processor is further configured to make corresponding adjustments to at least one type of sensor based on information collected by at least one of another type of sensor. The adjustment includes adjusting the physical position of the sensor and/or other physical settings for collecting the information, such that the information provided by the adjusted sensor to the processor has better signal quality.

Figure 14:
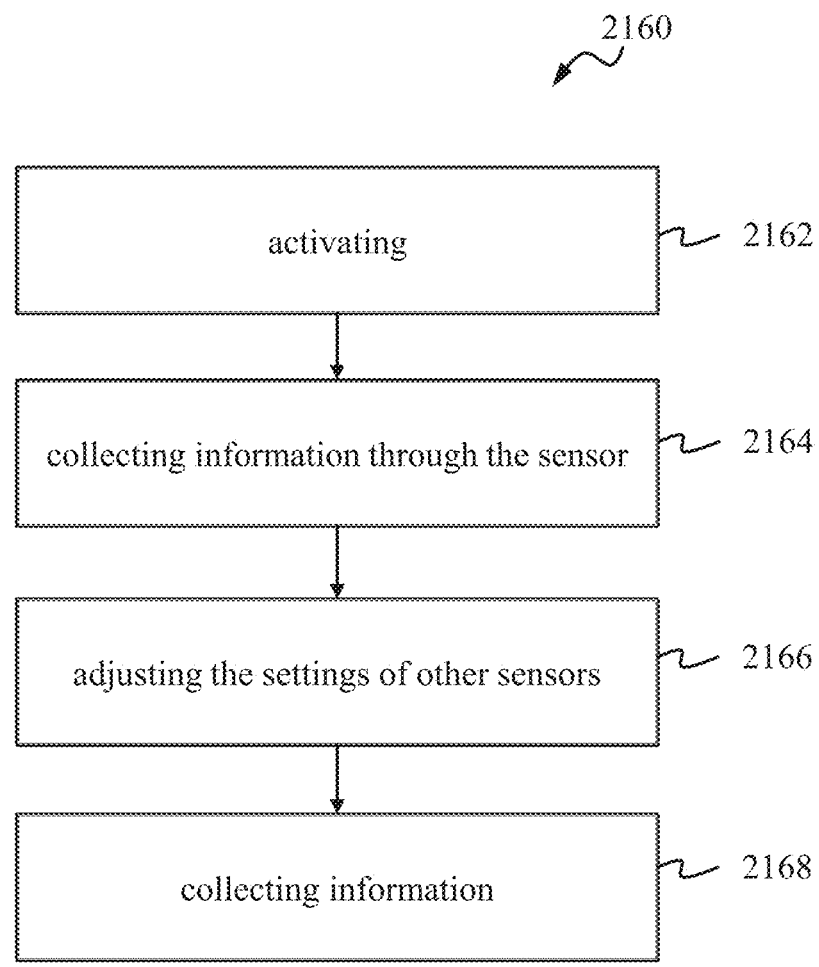
FIG. 14 is a flowchart of a combined multi-functional detection device according to one embodiment of the present invention.

FIG. 14 shows a schematic diagram of a workflow 2160 of a non-contact combined multi-functional detection device according to an embodiment of the present invention. The workflow of the non-contact combined multi-functional detection device includes automatically activating the vital sign detection process 2162, collecting information through the sensor 2164, adjusting the settings of other sensors based on the information collected by the sensor 2166, and collecting information 2168.

The combined multi-functional detection device is configured to automatically switch from a standby mode to an operating mode, that is, automatically activating the vital sign detection process 2162. According to one example, the processor of the combined multi-functional detection device is configured such that one sensor of the detection device periodically collects preliminary information from the detection area, and determines whether to start a vital signs detection process based on the preliminary information. The sensor used to collect preliminary information in standby mode may be any of the non-contact sensors used for vital signs detection during the operating mode. For example, the camera of the detection device may be configured to collect image information as preliminary information, or the radar sensor may send and collect radar signals as preliminary information. The processor is configured to periodically collect preliminary information from the detection area through one of the camera and the radar sensor, and determine whether the test subject is in the detection area based on the preliminary information, that is, to monitor whether there is a test subject with vital signs in the detection area.

If the processor determines that the test subject is in the detection area (that is, there is a test subject in the detection area awaiting detection), the multi-function detection device changes from the standby mode to the operating mode, and the vital signs detection process is started, wherein the vital sign detection process includes a non-contact blood pressure measurement process. The processor may be configured to: periodically collect preliminary information from the detection area through one of the camera and the radar sensor; determine whether the test subject is in the detection area based on the preliminary information; and if the test subject is determined to be in the detection area, to activate a vital sign detection process, wherein the vital sign detection process includes a blood pressure measurement process. The multi-function detection device is configured to use the measurement information 2164 of each sensor in the operating mode, and adjust the position, angle, etc. of other sensors based on the combined sensor method, such that each sensor performs vital sign measurement at a preferred setting (such as position 2166, etc.) 2168. The non-contact vital sign measurement includes non-contact blood pressure measurement. The processor is configured to summarize the collected information and send it to a remote server for further processing, analysis and storage.

If the processor determines that there is no test subject in the detection area, the detection device remains in a standby mode, and the processor continues to periodically collect preliminary information from the detection area. If one test subject leaves the detection area upon completing the detection for the test subject, the processor may automatically determine that there is no test subject with vital signs in the detection area, and switch from the operating mode to the standby mode. Preferably, the camera or radar sensor is configured to collect preliminary information every 5 seconds. The processor is configured to continue collecting preliminary information from the detection area every 5 seconds if no subject with vital signs is determined in the detection area. The multi-functional physiological detection device is set to be non-contact throughout and automatically enters standby mode or operating mode as required. It does not require on-site operation by a medical staff, which reduces the workload of the medical staff and the infection and cross-infection between the patients and the medical staff due to contact.

Figure 15:
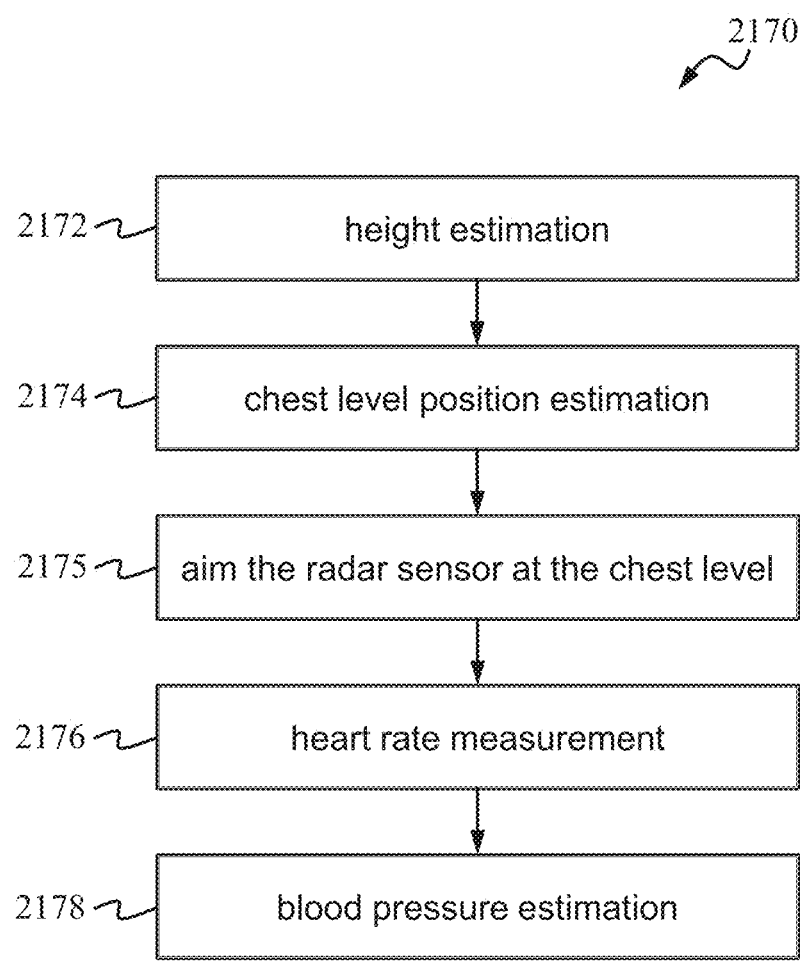
FIG. 15 is a flowchart of a blood pressure measurement by a combined multi-functional detection device according to an embodiment of the present invention.
Figure 16:
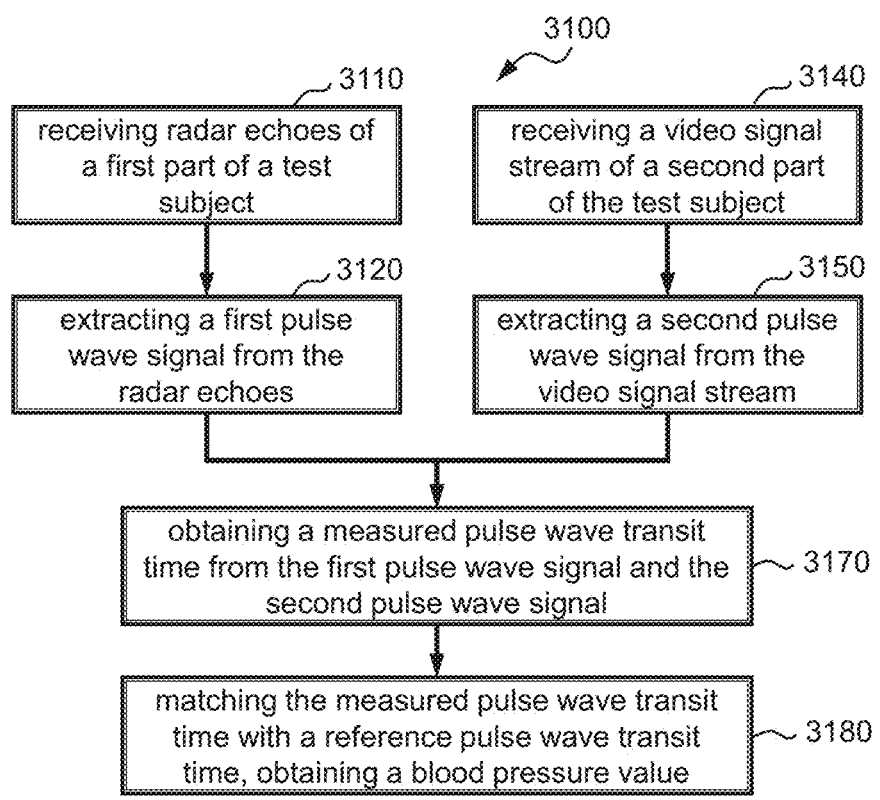
FIG. 16 is a schematic flow chart of a non-contact blood pressure measurement method according to an embodiment of the present invention.
Figure 17:
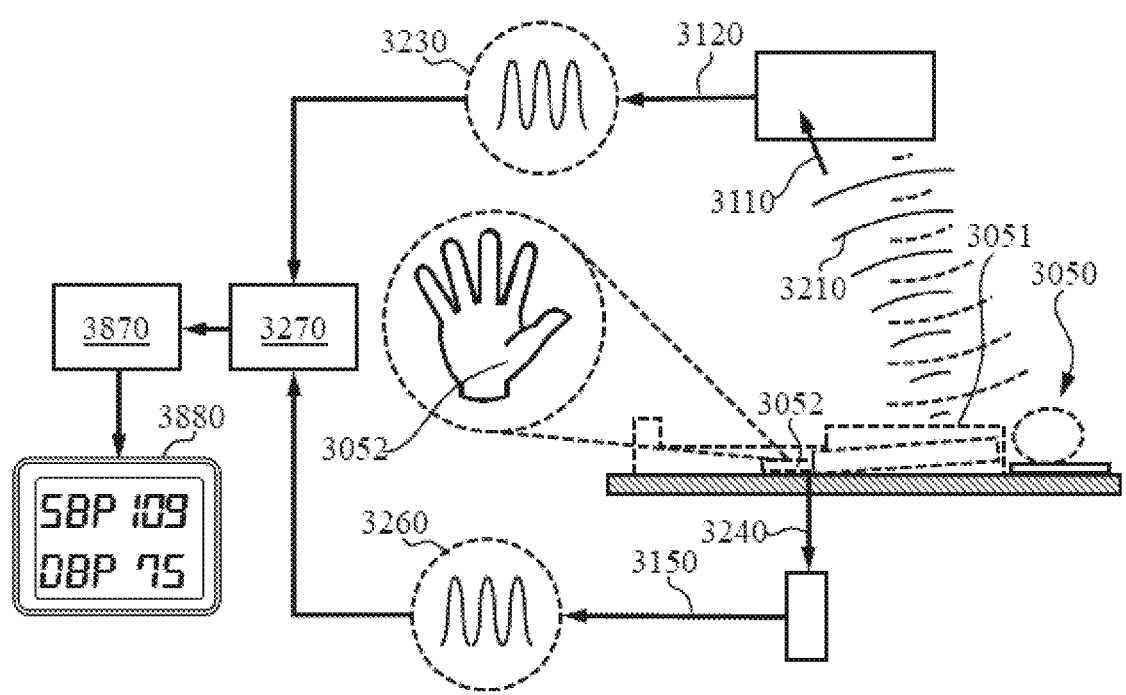
FIG. 17 is a schematic architecture diagram of the method as shown in FIG. 16.
Figure 18:
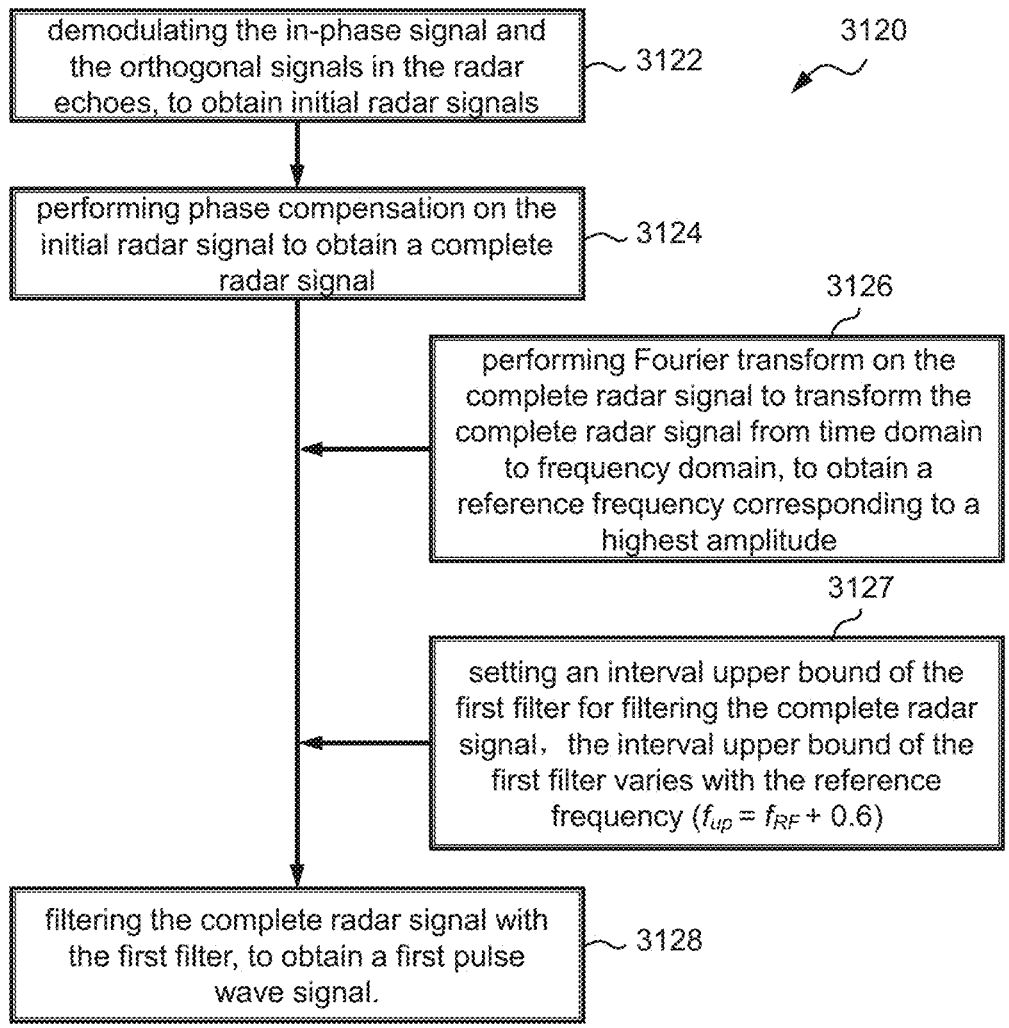
FIG. 18 is a schematic diagram of a radar signal processing flow in a non-contact blood pressure measurement method according to a preferred example of the present invention.
Figure 19:
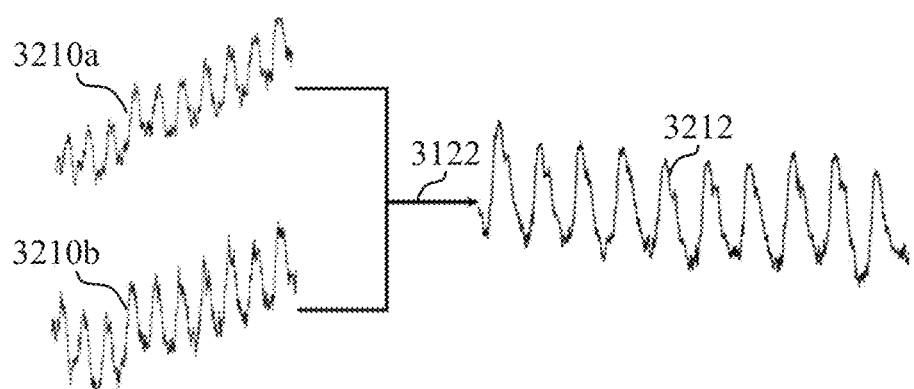
FIG. 19 is a schematic diagram of a radar signal processed in the method shown in FIG. 18.

FIG. 15 shows a vital signs detection process 2170 of a non-contact combined multi-functional detection device according to an embodiment of the present invention, which includes a non-contact blood pressure detection process. The vital signs detection process 2170 includes steps such as: body height estimation 2172, chest level position estimation 2174, aim the radar sensor at the chest level 2175, heart rate measurement 2176, blood pressure estimation 2178, etc.

The vital sign detection process 2170 may also include measurements of further vital signs. For example, in one example, the processor is configured to estimate the position of the test subject's forehead (or the area above the test subject's chest level) based on the acquired height or chest level position. The processor sends instructions to the corresponding driving unit, and the driving unit adjusts the infrared sensor to a position aligned with the forehead of the test subject, and adjusts the distance between the infrared sensor and the forehead to a predetermined value before measuring the forehead temperature of the test subject as a body temperature value. This enables the temperature detection method to be more consistent and standardized. Measurement of the test subject's body temperature may be synchronized with the collection of other vital signs to complete all information collection within 30 seconds. Therefore, the combined multi-functional detection device may provide a medical detection platform at a fixed detection platform site or ward, and may also operable as a mobile medical information detection robot platform. According to another example, the processor is configured to identify a preferred body temperature measurement part (for example, parts not covered by clothing, auricles, forehead, etc.) based on the information provided by the camera, and to place the infrared sensor at an optimal distance relative to the body temperature measurement part for body temperature measurement. The processor is configured to aggregate the body temperature information of the test subject and other vital signs, and send to the remote end server. The infrared driving unit is coupled to the infrared sensor and is configured to drive the infrared sensor to move vertically upward or vertically downward along direction 2122a, and to rotate the infrared sensor clockwise or counterclockwise in a horizontal plane about direction 2122b. The infrared sensor driving unit may also be configured to cause the infrared sensor to align with the preferred body temperature measurement part of the test subject, such as the forehead, based on the image information collected by the camera. Preferably, the infrared sensor is coupled to the processor, and the processor is configured to obtain a position of the forehead of the test subject, and to measure a forehead temperature of the test subject through the infrared sensor when a predetermined distance is formed between the infrared sensor and the forehead of the test subject.

Still referring to FIG. 15, the combined multi-functional detection device is configured to perform height estimation 2172. The processor is configured to obtain image information collected by the camera and/or radar signals collected by the radar sensor to estimate the height of the test subject. The image information may define reference object information. The processor may obtain distance information between the test subject and the radar sensor based on the radar signal. The processor may be configured to obtain the height of the test subject based on the image information defining the reference object information and the distance information. The blood pressure measurement process that the processor is configured to execute may include: obtaining the image information of the reference object from the camera; estimating the distance information of the test subject based on the radar signal; and obtaining the height of the test subject based on the image information of the test subject, the image information of the reference object, and the distance information.

The combined multi-functional detection device is configured to determine the chest level of the test subject 2174. According to one example, the processor is configured to: obtain image information of the reference object from the camera; estimate the distance information of the test subject based on the radar signal; and obtain the height of the test subject based on the image information of the test subject, the image information of the reference object, and the distance information. The processor can be configured to estimate the chest level of the test subject based on the height of the test subject. The processor may be configured to perform image processing based on the image obtained by the camera to obtain the key joint positions of the test subject. The key joint positions may include key nodes of the human body structure of the test subject, such as shoulders, forehead, auricles, joints, etc. The processor may be configured to estimate the position of the test subject's chest level based on two shoulder joint positions and the head joint position.

The combined multi-functional detection device is configured to align the antenna main lobe of the radar sensor with the chest level of the test subject 2175. The radar sensor may be set up to transmit radar signals and to collect the reflected radar signals. The radar sensor driving unit is coupled to the radar sensor and is configured to drive the radar sensor to move vertically upward or vertically downward along direction 2132a, and to rotate clockwise or counterclockwise in a horizontal plane about direction 2132b to adjust the position of the antenna main lobe of the radar sensor. The spatial position of the radar sensor is not limited to the predetermined body shape or height of the test subject, but may be automatically adjusted in response to the body shape, height, etc. of the test subject. The processor is configured to send a movement instruction to the relevant driving unit, based on the chest level of the test subject obtained from the image information collected by the camera, wherein the movement instruction may include at least one of a linear movement and a rotation, such that the configuration of the radar sensor is adjusted for the antenna main lobe of the radar sensor is aligned with the chest level of the test subject. The processor is configured to extract phase information of the radar signal corresponding to the distance between the radar sensor and the chest level of the test subject, when the antenna main lobe of the radar sensor is aligned with the chest level of the test subject. The processor is set to obtain the respiratory frequency and heart rate of the test subject 2176 through signal processing such as filtering and principal component analysis. In this way, accurate heart rate waveform acquisition may be achieved, thereby achieving accurate blood pressure measurement.

The processor is configured to obtain the blood pressure of the test subject based on the information collected by the camera and radar sensor. In one example, the processor obtains the blood pressure of the test subject based on at least one of the height of the test subject and the heart rate waveform 2178. The blood pressure measurement process that the processor is configured to execute may include: obtaining the respiratory frequency of the test subject based on the radar signal collected by the radar sensor; obtaining the heart rate waveform of the test subject based on the radar signal; and inputting the acquired height, heart rate waveform and other vital sign information as input variables into a neural network model established based on a medical database to estimate the blood pressure of the test subject.

The processor may obtain the test subject's blood pressure based on heart rate, body height and other information based on empirical formulas or machine learning algorithms. The machine learning algorithms may include but are not limited to, linear regression, support vector machines, k-nearest neighbor algorithm, logistic regression, decision trees, k-means, random forest, naive Bayes, dimensionality reduction, and gradient boosting algorithms.

Preferably, the multifunctional physiological detection device is configured to complete the collection of vital signs within a preset time period, such as 15 seconds to 30 seconds, wherein the collected information is suitable for estimating the blood pressure of the test subject. The test subject needs not maintain at a fixed posture for a long time, and the detection device may still collect relatively high-quality information for blood pressure estimation. The processor is configured to provide a reminder of physiological detection process status update to the test subject in the detection area. Optionally, the multifunctional physiological detection device may include a human-computer interaction device, which prompts the test subject, through voice, images, videos, etc., to maintain a posture as steady as possible to reduce body shaking. The processor may then summarize the patient's respiratory rate, heart rate waveform, blood pressure, body temperature and other information. Further, this information may be sent to medical staff for diagnosis, treatment, etc. of the test subject, or to a memory, server, etc. The multifunctional physiological detection device may include a communication transmission device to send the detection information to a remote end server. The processor may be configured to: complete the collection of the vital signs of the test subject within a preset time, such as 30 seconds, upon activating the vital signs detection process, and to send the collected vital signs of the test subject and the estimated blood pressure of the test subject to the remote end server. The detection device may be set to determine further medical health information based on empirical formulas, machine learning and other methods, combined with the detection information.

According to one embodiment, the present invention provides a combined multi-functional detection device, which includes a camera, a radar sensor, a processor and at least one driving unit. The at least one driving unit is coupled to the camera and the radar sensor. The at least one driving unit is configured to align the radar sensor with the chest level of the test subject and perform non-contact blood pressure measurement for the test subject based on the image information collected by the camera. In other words, the driving unit is coupled to the camera and the radar sensor respectively, and at least one driving unit is configured to, in response to the instruction sent by the processor, cause the radar sensor to move to align with the chest level of the test subject, for the sensor to determine the blood pressure of the test subject, wherein the movement of the radar sensor depends on the information collected by the camera. The detection device is configured such that the information collected by one sensor is concurrently used for configuring other sensors (such as displacement, etc.) and for estimating blood pressure or other vital signs, fully demonstrating the combined multi-functional detection process, reducing the time required for the test subject to maintain a fixed posture.

The radar sensor includes an antenna main lobe, wherein the at least one driving unit is configured to align the antenna main lobe with the chest level of the test subject, and to acquire the heart rate of the test subject when the antenna main lobe is aligned with the chest level of the test subject. The combined multi-functional detection device includes a processor coupled to the camera and radar sensors. The processor is configured to perform an alignment step, wherein the alignment step includes: obtaining the key joint position of the test subject based on the non-infrared image information collected by the camera; obtaining the chest level (which may be determined relative to the position of the radar sensor); and sending movement instructions to at least one driving unit, to align the radar sensor with the chest level of the test subject such that the signals reflected from the chest are received by the radar are of optimal quality. The detection device may be used in complex environments, for example, relatively accurate and reliable detection information may be obtained without the presence of medical staffs. The detection device therefore has a wide range of application, and is suitable for locations with relatively high people flow or locations where crowds gather (such as airports, shopping malls, concert venues, conference venues, tourist attractions, etc.). In this regard, detections can be carried out effectively amid the increasing shortage of medical staff, the risk of infection to the medical staffs can also be reduced.

As shown in FIGS. 16 to 19, according to one embodiment, the present invention provides a non-contact blood pressure measurement method 3100, which may be used as an independent solution for measuring the blood pressure of a test subject in a non-contact manner. The non-contact blood pressure measurement method 3100 may also be used in the vital sign detection device 100, the vital sign detection system 500, the vital sign detection method 600, the combined multi-functional detection device 2100, and/or the vital sign detection process 2170 as described in the aforementioned embodiments of the present application, as a preferred, additional, specific and/or alternative technical solution, for measurement of blood pressure of the test subject in a non-contact manner. The method 3100 includes, at step 3110, receiving radar echoes 3210 of a first part of a test subject 3050, at step 3120, extracting a first pulse wave signal 3230 from the radar echoes 3210, and receiving a video signal stream of a second part of the test subject 3050 at step 3140, and extracting a second pulse wave signal 3260 from the video signal stream 3240 at step 3150, and obtaining a measured pulse wave transit time 3270 from the first pulse wave signal 3230 and the second pulse wave signal 3260 at step 3170. Thereafter, at step 3180, the present method includes, matching the measured pulse wave transit time 3270 with a reference pulse wave transit time 3870, thereby obtaining a blood pressure value 3880 corresponding to the measured pulse wave transit time 3270.

The first part may be a body part with an artery point which is at a first distance away from the body surface of the test subject 3050 and the heart, such as a chest part 3051 corresponding to the position of the heart. The second part is a body part with another artery point which is at a second distance away from the body surface of the test subject 3050 and the heart, such as a palm part 3052. That is, the second distance is greater than the first distance.

According to a preferred example, the step 3120 of extracting the first pulse wave signal 3230 from the radar echoes 3210 includes: at step 3122, demodulating the in-phase signal (I) 3210$a$ and the orthogonal signals (Q) 3210$b$ in the radar echoes 3210, to output the radar echoes 3210 as initial radar signals 3212, for example, performing demodulation processing according to the following formula:

$$R(t) = \arctan\left(\frac{Q(t)}{I(t)}\right) \quad (1)$$

In formula (1), Q(t) represents the orthogonal signals in the radar echoes 3210, I(t) represents the in-phase signals in the radar echoes 3210, and R(t) represents the initial radar signals 3212 after the demodulation processing, where the expressions of Q(t) and I(t) are represented by the following formula (2):

$$\begin{cases} Q(t) = \sin\left[\theta + \frac{4\pi x(t)}{\lambda} + \frac{4\pi y(t)}{\lambda} + \Delta\varphi(t)\right] \\ I(t) = \cos\left[\theta + \frac{4\pi x(t)}{\lambda} + \frac{4\pi y(t)}{\lambda} + \Delta\varphi(t)\right] \end{cases} \quad (2)$$

In formula (2), x(t) and y(t) represent the chest wall displacement caused by cardiac activity and respiration of the test subject, respectively, in which Δφ(t) is the residual phase noise.

Upon obtaining the initial radar signal 3212, at step 3124, the present method includes performing phase compensation processing on the initial radar signal 3212 to reduce the impact of factors such as phase offset and gain imbalance, thereby obtaining a complete radar signal 3224.

At step 3126, the method includes performing a Fourier transform on the complete radar signal 3224, to transform the complete radar signal 3224 from time domain to frequency domain, and based on the frequency $f_{RF}$ corresponding to the highest amplitude in the complete radar signal 3224 as reference, obtaining the estimated heart rate value (HR) according to the following formula (3):

$$HR = f_{RF} * 60 \qquad (3)$$

At step 3127, the method includes setting an interval upper bound of the first filter for filtering the complete radar signal, wherein the interval upper bound of the first filter varies based on the reference frequency. For example, taking $f_{RF}$ as the reference frequency, the interval upper bound of the filter is set as a function related to the reference frequency $f_{RF}$ as defined by the following formula (4), that is, the upper bound of the filter interval varies based on the reference frequency:

$$f_{up} = f_{RF} + 0.6 \qquad (4)$$

In formula (4), $f_{up}$ is the interval upper bound of the filter, and the upper and lower bound of the filter are $[0.7, f_{up}]$.

At step 3128, the present method includes inputting the complete radar signal 3224 to a Butterworth filter configured according to the above upper and lower bound for filtering processing, so as to output from the filter a first pulse wave signal (rPPG-1) 3230 related to the heartbeat of the test subject.

As shown in FIGS. 17, 20 to 24, step 3150 of extracting the second pulse wave signal 3260 from the video signal stream 3240 includes: At step 3152, extracting the original green channel signal 3242 from the video signal stream 3240 and at step 3154, removing interference signals from the original green channel signal 3242 to obtain a baseline-drift-eliminated green channel signal 3254.

Figure 20:
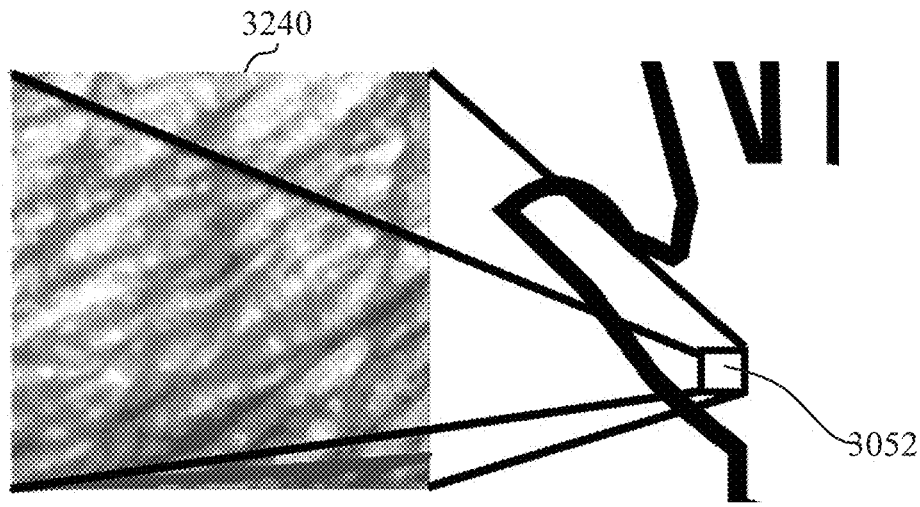
FIG. 20 is a schematic diagram of receiving a video signal stream of a second part of a test subject in the method shown in FIG. 19.
Figure 21:
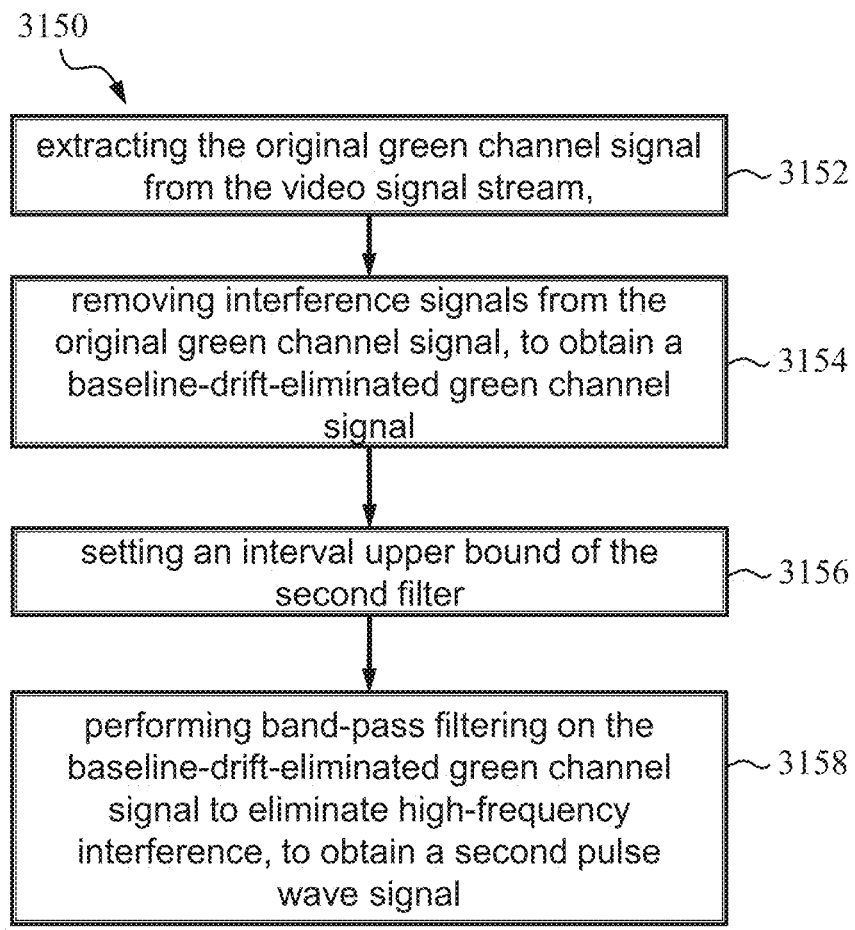
FIG. 21 is a schematic flowchart of video signal processing in a non-contact blood pressure measurement method according to a preferred example of the present invention.
Figure 22:
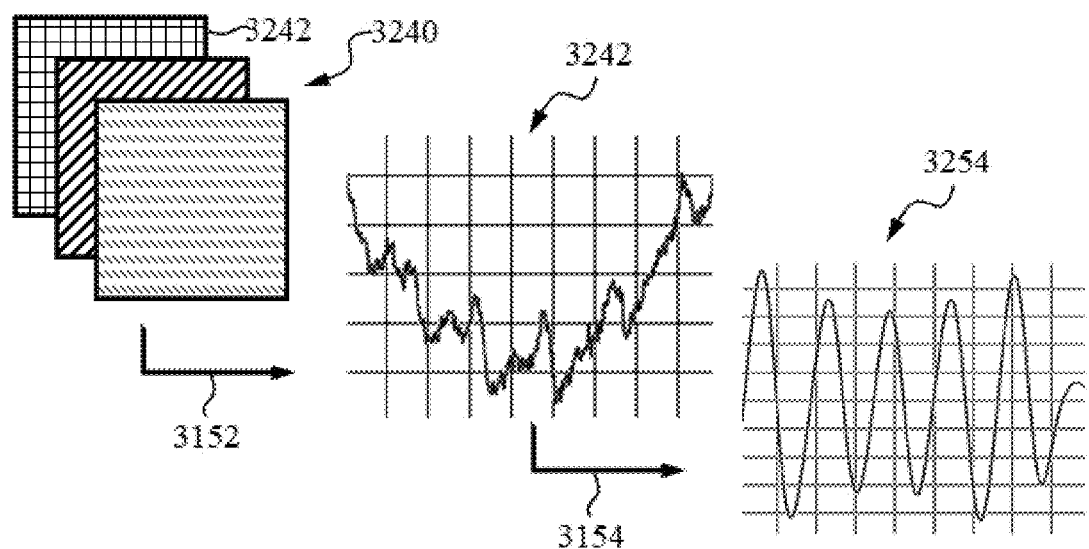
FIG. 22 is a schematic diagram of a video signal processed in the method shown in FIG. 21.
Figure 23:
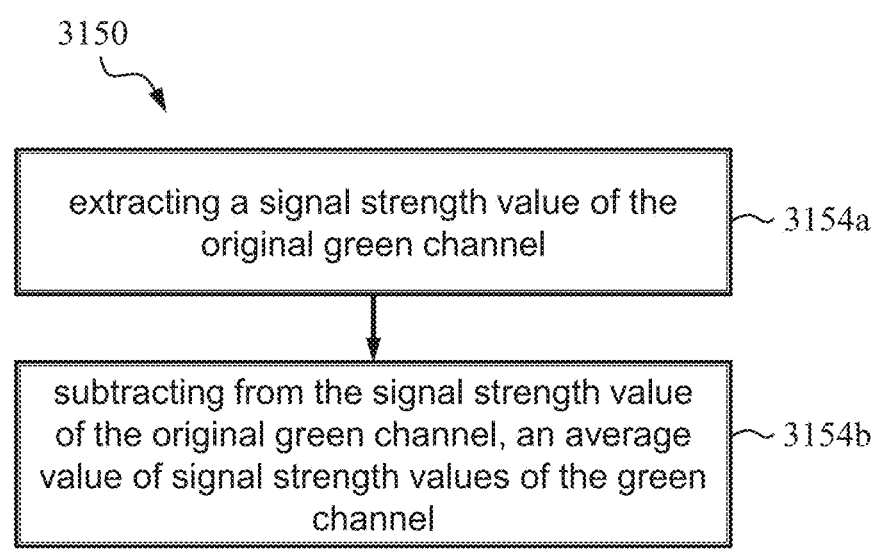
FIG. 23 is a schematic flowchart of video signal processing in a non-contact blood pressure measurement method according to a preferred example of the present invention.

As shown in FIG. 20, the optical signals of the blood vessels and arteries in the palm 3052, are used as the video signal stream of the palm as captured and received. In addition, since there is little difference in the palm of test subjects with different skin colors, the video signal received is also less affected by skin color.

Each frame of image input by the video signal stream 3240 is represented by M*N*3, wherein M and N represent the height and width of the video image, respectively, and 3 represents the three RGB channels of red, green, and blue of the video signal stream 3240.

In the present method, the step 3154 of removing the interference signal may include, at step 3154a, extracting the signal strength value of the original green channel and at step 3154b, subtracting a signal strength value of the green channel from a signal strength value of the original green channel.

For example, the step 3154 of removing the interference signal may be performed as represented by the following equation (5):

$$G_{new} = G_{raw} - G_{mean} \qquad (5)$$

In formula (5), $G_{new}$ represents the baseline-draft-eliminated green channel signal 3254, $G_{raw}$ represents the separated original green channel signal, $G_{mean}$ is the mean value of the green channel, which is calculated by the following formula (6):

$$G_{mean} = \frac{\sum_{i=0}^{M} \sum_{j=0}^{N} I(i, j)}{M \times N} \qquad (6)$$

In formula (6), I is the input green channel image, which has a size M*N. Upon obtaining the baseline-drift-eliminated green channel signal 3254, at step 3156, the method includes setting an interval upper bound of the second filter. At step 3158, the method includes performing band-pass filtering on the baseline-draft-eliminated green channel signal 3254 to eliminate high-frequency interference, to obtain a second pulse wave signal (rPPG-2) 3260, wherein the upper bound frequency of the band-pass filter is set according to the above step 3128 and the reference frequency $f_{RF}$ as defined in Equation (4). For example, the upper bound frequency of the band-pass filter varies based on the reference frequency $f_{RF}$.

The step 3170 of obtaining the measured pulse wave transit time 3270 from the first pulse wave signal 3230 and the second pulse wave signal 3260 includes: extracting, from the first pulse wave signal 3230 and the second pulse wave signal 3260, the time difference between the blood flow signals pumped from the subject's heart to the first part (chest) and the second part (palm) respectively, that is, in the same cardiac cycle, and obtaining a measured pulse wave transit time (nPTT) 3270 based on a delay of the pulse wave peak, thereafter, matching the wave transit time (nPTT) 3270 with a reference pulse wave transit time, to obtain a blood pressure value corresponding to the measured pulse wave transit time.

According to a specific example, the corresponding relationship between non-contact pulse transit time (nPTT) and blood pressure is determined according to the following formula (7):

$$\begin{cases} DBP = \alpha_1 \times \exp\left(-\left(\frac{nPTT - \beta_1}{\gamma_1}\right)^2\right) \\ SBP = \alpha_2 \times \exp\left(-\left(\frac{nPTT - \beta_2}{\gamma_2}\right)^2\right) \end{cases} \qquad (7)$$

In formula (7), $\alpha_1$, $\beta_1$, $\gamma_1$, $\alpha_2$, $\beta_2$, and $\gamma_2$ are fitting coefficients, respectively, used to reflect changes in blood pressure under different vascular physiological conditions. SBP and DBP represent diastolic blood pressure and systolic blood pressure, respectively. Based on the ECG signal and pulse wave signal in the MIMIC public data set, the blood pressure values corresponding to the pulse wave transit time (PTT) are obtained, that is, the systolic blood pressure value and the diastolic blood pressure value, and a more accurate nPTT-blood pressure regression model is formed by non-linear fitting, to establish the corresponding relationship between reference pulse wave transit time and blood pressure. By matching the pulse wave transit time (nPTT) 3270 obtained from measurement results according to the embodiment of the present invention, with the reference pulse wave transit time, the diastolic and systolic blood pressure values corresponding to the measured pulse wave transit time may be obtained. Alternatively, the pulse wave transit time obtained from the measurement results according to the embodiment of the present invention may be introduced into the above-mentioned nPTT-blood pressure regression model, by which, the blood pressure diastolic pressure and systolic blood pressure values corresponding to the measured pulse wave transit time may be obtained.

Table 2 shows the comparison of the blood pressure obtained by the method of the present invention and the traditional contact blood pressure measurement method of four test subjects.

TABLE 2

Comparison of blood pressure test results between the present invention and traditional methods

| | Systolic blood pressure | | | | Diastolic blood pressure | | | |
|---|---|---|---|---|---|---|---|---|
| Test subject | Present invention | Traditional method | Error | Error rate | Present invention | Traditional method | Error | Error rate |
| 1 | 108.5 | 101 | 7.5 | 7.45% | 63.9 | 57 | 6.9 | 12.11% |
| 2 | 103.8 | 115 | −11.2 | 9.74% | 52.6 | 56 | −3.4 | 6.07% |
| 3 | 118.6 | 117 | 1.6 | 1.37% | 70.5 | 64 | 6.5 | 10.16% |
| 4 | 107.4 | 106 | 1.4 | 1.32% | 63.1 | 69 | −5.9 | 8.55% |

According to Table 2, in comparison to the traditional method, the error rates of diastolic blood pressure and systolic blood pressure measured according to the method of the present invention are 4.97% and 9.22% respectively. The results show that the blood pressure measurement results according to the method of the present invention are relatively close to the traditional method, and the measurement accuracy is high.

According to one embodiment, the present invention provides a non-contact blood pressure measurement device, which may be used as an independent solution for measuring the blood pressure of a test subject in a non-contact manner. The non-contact blood pressure measurement device 3600 may also be used as the vital sign detection device 100, the vital sign detection system 500, the vital sign detection method 600, the combined multi-functional detection device 2100, and/or the vital sign detection process 2170 in the aforementioned embodiments of the present application as preferred, additional, specific and/or alternative solutions for measuring the blood pressure of a subject in a non-contact manner.

Figure 24:
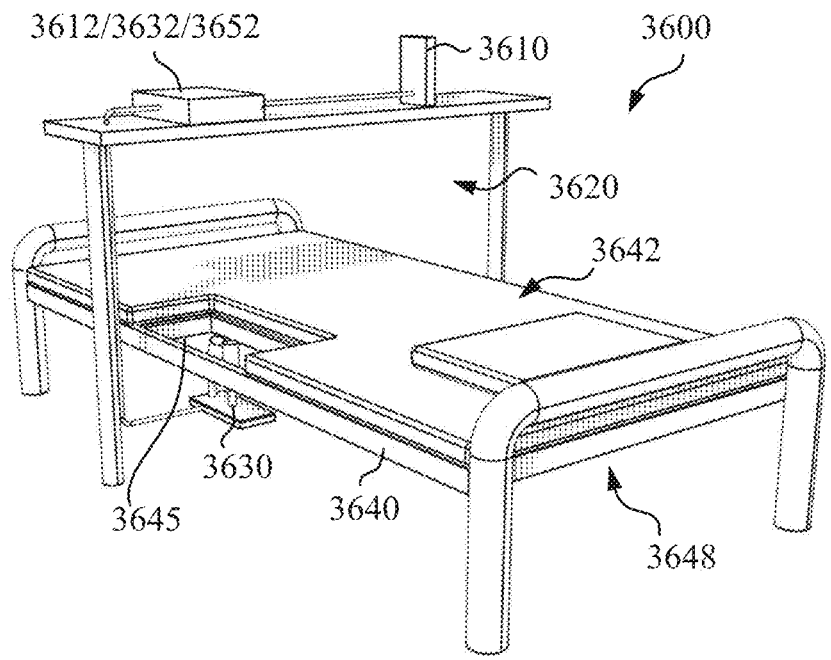
FIG. 24 is a perspective view of a non-contact blood pressure measurement device according to an embodiment of the present invention.
Figure 25:
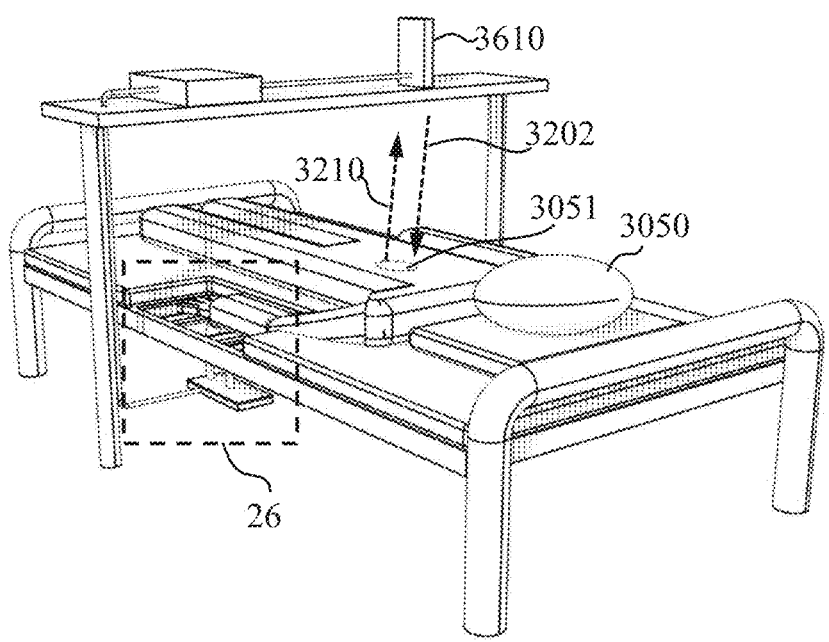
FIG. 25 is a perspective view of a blood pressure measurement scene of the device as shown in FIG. 24.
Figure 26:
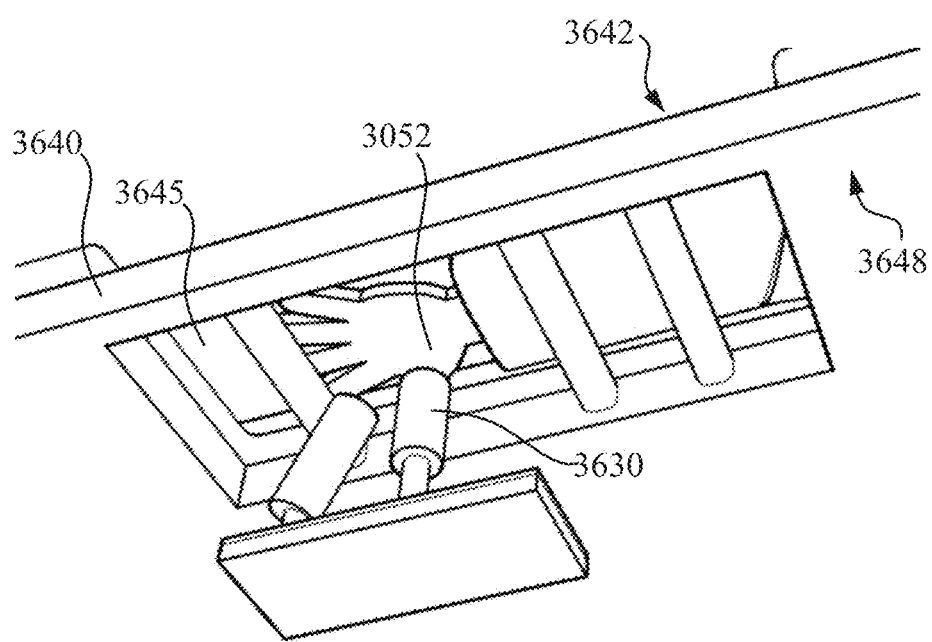
FIG. 26 is a bottom perspective view of a part 26 of FIG. 25.

As shown in FIGS. 24, 25 and 26, according to an independent solution, the non-contact blood pressure measurement device 3600 of the present invention includes a radar device 3610, a radar signal processor 3612 coupled to the radar device 3610, and a video device 3630, a video signal processor 3632 coupled to the video device 3630, and a data processor 3652 coupled to the radar signal processor 3612 and the video signal processor 3632. The radar device 3610 is configured to emit radar signals 3202 to a test subject 3050 and to receive radar echoes 3210 from a first part 3051 of the test subject 3050. The radar signal processor 3612 is configured to extract a first pulse wave signal from the radar echoes 3210. The video device 3630 is configured to receive a video signal stream of a second part 3052 of the test subject 3050. The video signal processor 3632 is configured to extract a second pulse wave signal from the video signal stream. The data processor 3652 is configured to obtain a measured pulse wave transit time from the first pulse wave signal and the second pulse wave signal, and to match the measured pulse wave transit time with a reference pulse wave transit time, to obtain a corresponding blood pressure value.

According to a preferred example, the radar signal processor 3612 is further configured to demodulate in-phase signals and orthogonal signals in the radar echoes, to obtain an initial radar signal, and to perform phase compensation on the initial radar signal to obtain a complete radar signal.

According to a preferred example, the device further includes a first filter and a second filter, and the radar signal processor is further configured to transform the complete radar signal from time domain to frequency domain, to obtain a reference frequency corresponding to a highest amplitude; the first filter is configured to filter the complete radar signal to obtain a first pulse wave signal, wherein an upper bound frequency of the first filter is set to vary based on the reference frequency;

The video signal processor is further configured to extract the original green channel signal from the video signal stream, to remove interference signals from the original green channel signal to obtain a baseline-drift-eliminated green channel signal, to set an interval upper bound of the second filter, and to filter the baseline-drift-eliminated green channel signal with the second filter, to obtain the second pulse wave signal, wherein the interval upper bound of the second filter varies based on the reference frequency.

According to a preferred example, the non-contact blood pressure measurement device 3600 according to an embodiment of the present invention also includes a bearing frame 3640, such as a bed or similar table or bearing plate that may support the test subject in a supine posture. etc., to receive and support the test subject 3050. The bearing frame 3640 has a first surface 3642, such as the upper surface of the bed 3640, a second surface 3648 opposite the first surface 3642, such as the lower surface of the bed 3640, and a window 3645 through the first surface 3642 and the second surface 3648.

The radar device 3610 is fixed on the side of the bearing frame 3640 facing the first surface 3642, that is, above the bed and at a first position spaced apart from the bearing frame 3640. An accommodating space 3620 for receiving the test subject 3050 on the first surface 3642 is formed between the radar device 3610 and the bearing frame 3640. The first position is opposite to the first part of the test subject 3050, such as the chest 3051, such that the radar device 3610 can transmit radar signals 3202 to the test subject 3050 and receive radar echoes 3210 from the first part 3051 of the test subject 3050.

The video device 3630 is fixed below the bed, that is, at a second position on the other side of the bearing frame 3640 facing the second surface 3648 and spaced apart from the bearing frame. The second position is aligned with the second part 3052 of the test subject, that is, the palm, through the window 3645, such that the video device 3630 may capture the image of the second part 3052 of the test subject 3050 through the window 3645 and receive a video signal of the second part 3052 of the test subject 3050.

Figure 27:
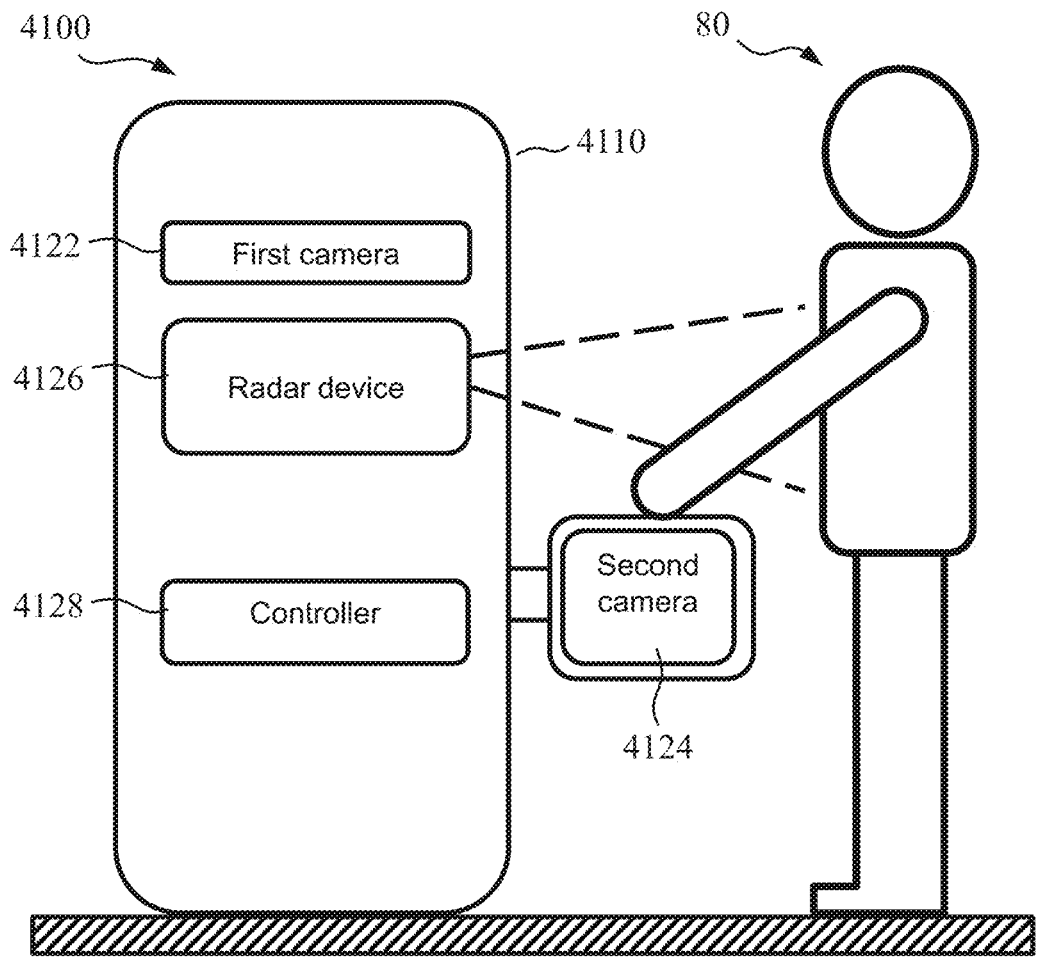
FIG. 27 is an architecture block diagram of a non-contact blood pressure measurement device according to yet another embodiment of the present invention.

According to yet another embodiment, the present invention provides a non-contact blood pressure measurement device and a non-contact blood pressure measurement method based on a single sensor. As shown in FIG. 27, the non-contact blood pressure measurement device 4100 according to this embodiment includes a main body 4110, a sensor coupled to the main body 4110, such as a first camera 4122, a second camera 4124 and/or a radar device 4126, and a controller 4128 in data connection with the first camera 4122, the second camera 4124 and/or the radar device 4126. The first camera 4122, the second camera 4124 and/or the radar device 4126 are configured to detect pulse wave signals of the test subject 80. The controller 4128 is configured to receive pulse wave signals from the first camera 4122, the second camera 4124 and/or the radar device 4126, and to obtain the blood pressure of the test subject based on the received pulse wave signals.

Figure 28:
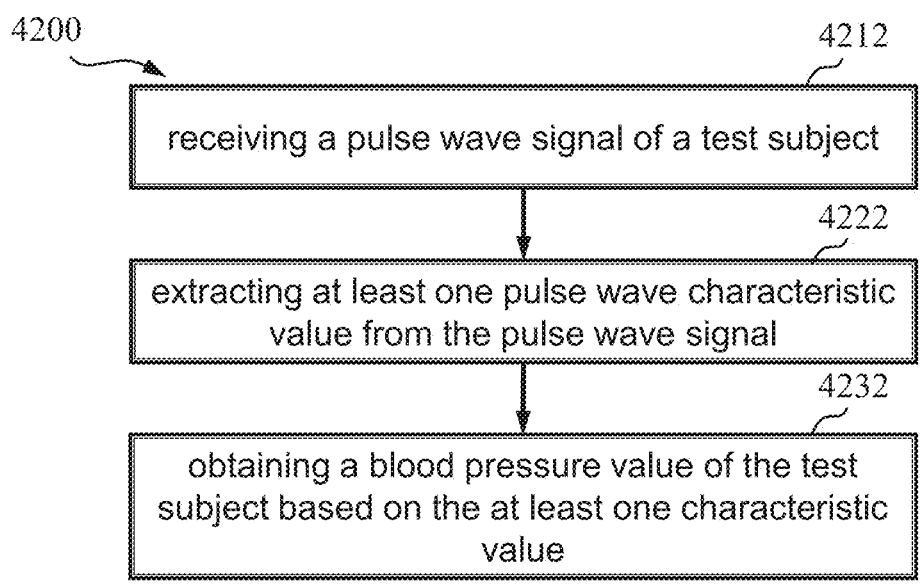
FIG. 28 is a schematic flowchart of a non-contact blood pressure measurement method according to the embodiments shown in FIGS. 2 to 7.

As shown in FIG. 28, the non-contact blood pressure measurement method 4200 according to the present embodiment includes, at step 4212, receiving a pulse wave signal of a test subject, at step 4222, extracting at least one pulse wave characteristic value from the pulse wave signal and at step 4232, obtaining a blood pressure value of the test subject based on the at least one characteristic value.

The radar device in this example is operable in, but not limited to, the following working modes, such as continuous-wave radar, frequency-modulated continuous-wave radar and ultra-wideband radar, etc. The controller 4128 is configured to extract at least one characteristic value from the pulse wave signal, and to obtain the blood pressure of the test subject based on the at least one characteristic value.

Figure 29:
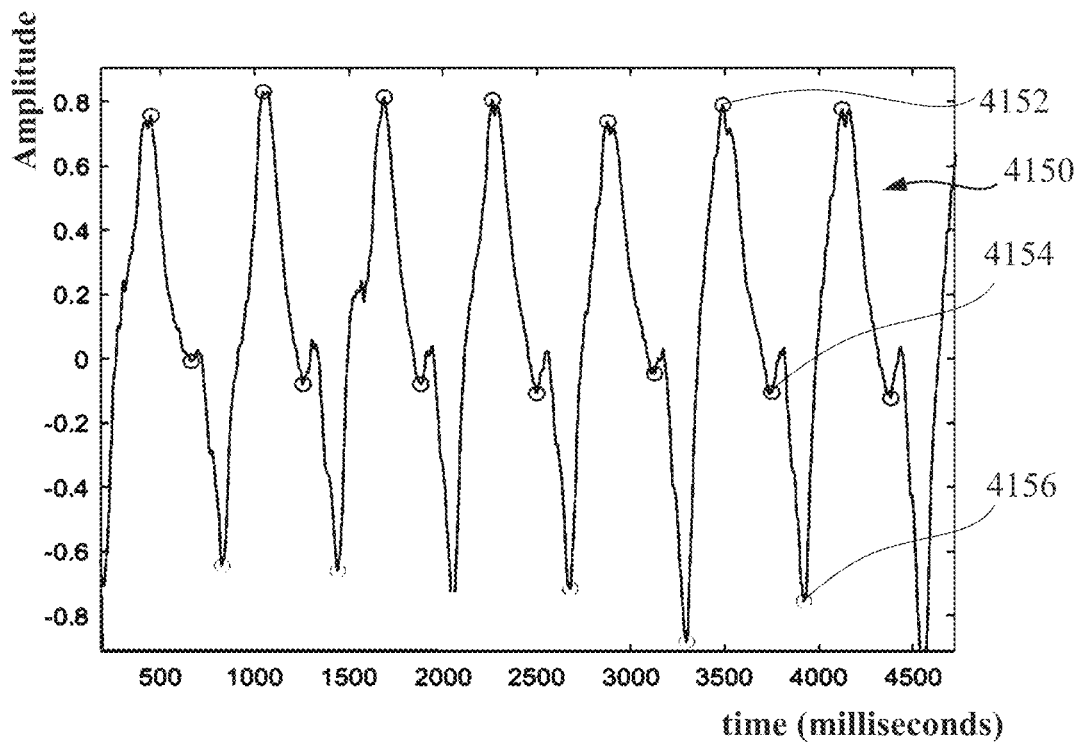
FIG. 29 is an example pulse wave curve obtained according to the device as shown in FIG. 27 and the method as shown in FIG. 28.

In detail, as shown in FIGS. 27, 28 and 29, the controller 4128 firstly obtains the maximum amplitude, that is, an amplitude peak in the sampled waveform data, from the pulse wave 4150 of the test subject 80 received by the first camera 4122, the second camera 4124 and/or the radar device 4126. As the pulse wave is periodic, by setting a window around the maximum value and searching for the next peak in the window, all peaks in the waveform may be obtained, such as point B shown in FIG. 30. The window size may be determined as the time interval containing the two peaks. In this example, the time interval is set from 600 milliseconds to 800 milliseconds. The same method may be used to obtain the corresponding position of the wave trough (point E).

Upon obtaining the positions of all peaks (point B) and troughs (point E) in the sampled waveform data, each periodic data of the pulse wave may be obtained. Within a time period, using a differential method (finding the approximate derivative of the pulse waveform, and finding the extreme point of the derivative) to obtain the maximum and minimum values, which are the positions of the second wave trough (point C) and the second wave peak (point D). Due to the presence of noise, there may be more than one maximum and minimum value. Selecting the position with the largest difference as the second peak (point D) and trough (point C) may filter out most of the noise. Thereafter, taking the variance of the resulting second wave peaks and troughs, and performing a second filtering to completely eliminate these noises.

Figure 30:
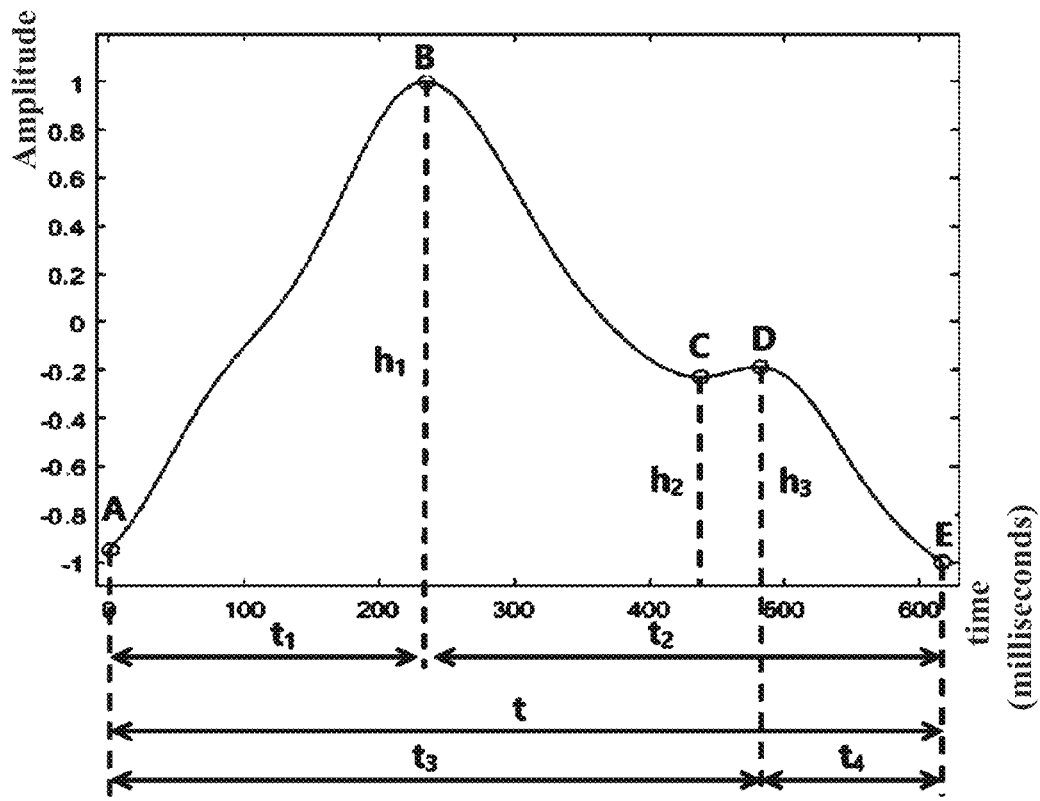
FIG. 30 is a schematic diagram of an example peak curve of the pulse wave curve shown in FIGS. 2 to 9 and an expected corresponding wave data.

According to the time and amplitude of the obtained characteristic points, the initial data corresponding to the sample waveform as shown in FIG. 30 may be obtained, such as the total time t, the time t1 from the start of the waveform to the first peak, and the time from the first peak to the end of the waveform time t2, from the start of the waveform to the peak of the double pulse time t3, from the peak of the double pulse to the end of the waveform time t4, amplitude h1 of the first peak, amplitude h2 of the trough between the first peak and the peak of the double pulse, and value h3 of the amplitude of the double pulse. Based on the above initial data, the pulse wave characteristic values used for pulse wave signal data processing in this example may be further obtained, with the characteristic values including but are not limited to: contraction time ratio (t1/t), double beat time (t4/t), diastolic time ratio (t2/t), relative height of notch (h2/h1), relative height of double pulse wave (h3/h1), heart rate, etc.

Figure 31:
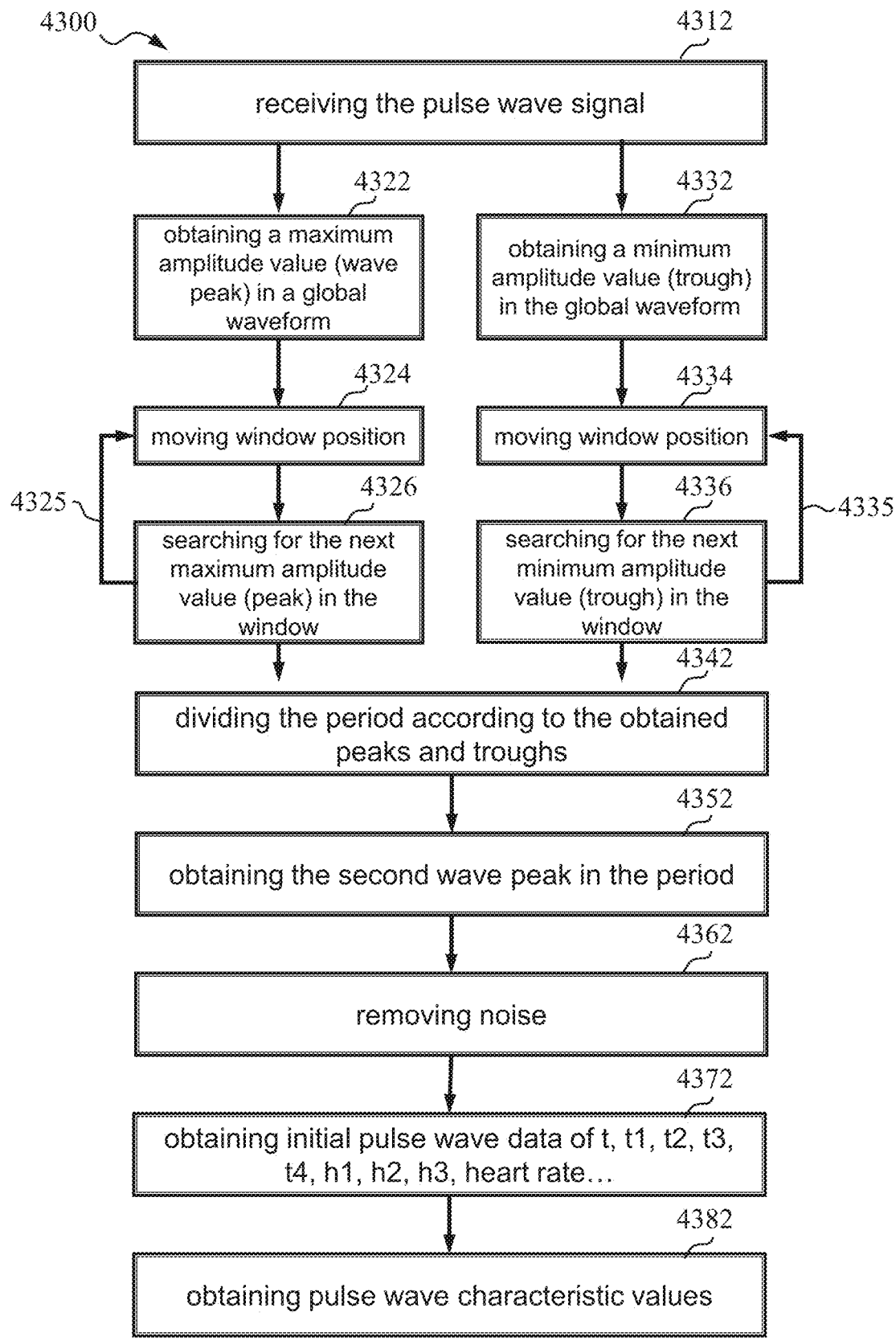
FIG. 31 is a schematic flowchart of the steps of extracting at least one pulse wave characteristic value in the method shown in FIGS. 2 to 8.

As shown in FIG. 31, the method 4300 for obtaining pulse wave characteristic values according to this embodiment includes a step 4312 of receiving the pulse wave signal, a step 4322 of separately or concurrently obtaining a maximum amplitude value (wave peak) in a global waveform and a step 4332 of obtaining a minimum amplitude value (trough) in the global waveform, window position movement steps 4324 and 4334 of the respective previous steps, a step 4326 of searching for the next maximum amplitude value (peak) in the window, a step 4336 of searching for the next minimum amplitude value (trough) in the window, and necessary loop search steps 4325 and 4335 and thereafter, a step 4342 of dividing the period according to the obtained peaks and troughs, a step 4352 of obtaining the second wave peak in the period, a step 4362 of removing noise, and step 4372 of obtaining initial pulse wave data of t, t1, t2, t3, t4, h1, h2, h3, heart rate, etc., and a step 4372 of obtaining pulse wave characteristic values based on the initial pulse wave data.

According to the pulse wave characteristic values, the present embodiment further constructs a training set of the blood pressure measurement model through a random forest model, which is a set composed of samples for fitting parameters. A training set may be data pairs formed by input vectors (scalars) and an output vectors (scalars).

Figure 32:
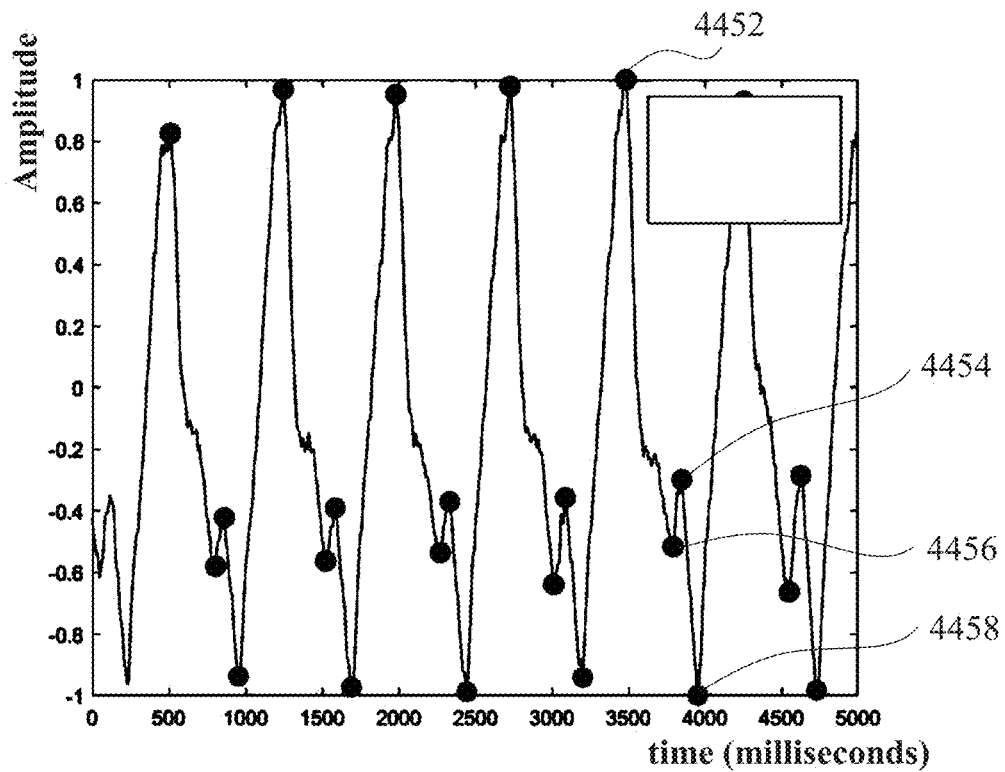
FIG. 32 is an example pulse wave curve diagram of a random forest model built according to the device as shown in FIG. 27 and the method as shown in FIG. 28.

The method of the device according to this example uses a single non-contact sensor, such as a radar device or a video device, to obtain and store the pulse waves of multiple test subjects as a training set. An example pulse wave is shown in FIG. 32, wherein the reference numeral 4452 represents the pulse wave peak, 4454 represents the dicrotic wave peak, 4456 represents the dicrotic wave trough, and 4458 represents the pulse wave trough. At the same time, the actual blood pressure value of each subject is measured with a sphygmomanometer and stored as the true value. Upon applying the above feature extraction method to obtain the corresponding pulse wave features, the relevant characteristic values measured by each subject and the corresponding real blood pressure value are stored in an n×d matrix. The specific example expression is as follows:

$$[\text{Features}, bp]_{n \times d}$$

Wherein, n represents the size of the database, that is, the number of samples. In this embodiment, n is 125; d represents the dimension of the matrix, which represents the number of matrix features. In this embodiment, d is 8; Features represents the feature values obtained from the waveform; bp represents the characteristic value of blood pressure. In this example, the characteristic value of blood pressure is the systolic blood pressure and diastolic blood pressure, both measured using a sphygmomanometer.

The waveform eigenvalues and blood pressure eigenvalues may have multiple expressions, and the order of these eigenvalues will not affect the final model. As examples, blood pressure characteristic values include but not limited to blood pressure values obtained by direct measurement, the zero-mean blood pressure values (that is, subtracting the corresponding average value from all blood pressure values obtained so that the overall data mean is 0) and the normalized blood pressure value (based on the zero-mean blood pressure value, divided by the standard deviation of the original blood pressure value) and other characteristic values.

Table 3 is an example of a data set corresponding to pulse wave features. The pulse wave features (Features) include heart rate, diastolic time proportion, relative height of double pulse wave, systolic time proportion, double beat time, relative height of notch; bp is the blood pressure, including diastolic blood pressure and systolic blood pressure.

dictorImportance' is set to 'on', which means that the system can store the observation information of each tree. oobPrediction may use this information to calculate the predicted class probability for each tree in the collection. This probability may be used to observe the situation during the training process.

Preferably, in the present embodiment, during the training process, the random forest model related parameter is set to min_sample_leaf=5. This parameter determines the end node of the decision tree. The smaller the value, the easier it is for the model to capture the noise in the training data. In this embodiment, the value is set to 5. Those skilled in the art will understand that for data of different sizes, different numbers of end nodes may be used to produce different performances.

Preferably, according to the present embodiment, during the training process, the random forest model related parameter is set to max_features=2. This parameter is the maximum number of features Random Forest allows to try in a single tree. This option will take the square root of the total number of features in a single run. In this example, the input quantity is 6, so 2 variables will be taken in a single decision tree. Those skilled in the art will understand that different maximum number of features may be used for data with different feature dimensions.

During the training process, the current model makes predictions for each sample in the training set and compares the predictions with the target. Based on the results of the

TABLE 3

Examples of data sets corresponding to pulse wave features

| heart rate | diastolic time ratio | Double pulse wave relative height | Shrink time ratio | double beat time | relative height of notch | diastolic blood pressure | systolic blood pressure |
|---|---|---|---|---|---|---|---|
| 96 | 0.5989 | 0.4087 | 0.4011 | 0.352 | 0.3841 | 57 | 119 |

In the present embodiment, the treebagger function is used in the MATLAB environment to obtain the reference data model. Preferably, the model is trained using 100 decision trees. The number of decision trees 100 means that the data is randomly selected and divided into 100 groups of data, and a group of data is used each time to train a base learner (also called a weak learner, which is an individual learner). After randomly sampling 100 times with replacement, 100 base models trained by different training sets may be obtained at the end of training. According to the prediction results of the 100 base models, by averaging the prediction results, a more accurate and reasonable final prediction result may be obtained (the integrated model, which is a random forest in this embodiment). It may be seen that the larger the number of trees, the better the performance, but the slower the code runs. This embodiment uses 100 decision trees. Those skilled in the art will understand that for data of different sizes, different numbers of decision trees may be used to meet actual requirements.

Preferably, the random forest model kernel used in this embodiment is 'regression'. The model kernel is divided into 'classification' and 'regression'. This embodiment adopts the form of regression. In comparison with classification problems that only have a fixed number of categories, the blood pressure value is a continuous value, and the regression model may predict blood pressure more accurately.

Preferably, in this embodiment, during the training process, the random forest model related parameter 'OOBPrecomparison, the learning algorithm updates the parameters of the model. Upon completion of the training, it is only needed to input the input vector Features, and the model may output the prediction result, that is, the blood pressure prediction value of the test subject. Upon building the model with the training set, input the pulse wave waveform of the test subject detected by the non-contact sensor described above, and through the pulse wave characteristic value extraction process, input the obtained pulse wave characteristic into the trained random forest model, to get the blood pressure measurement results.

Figure 33:
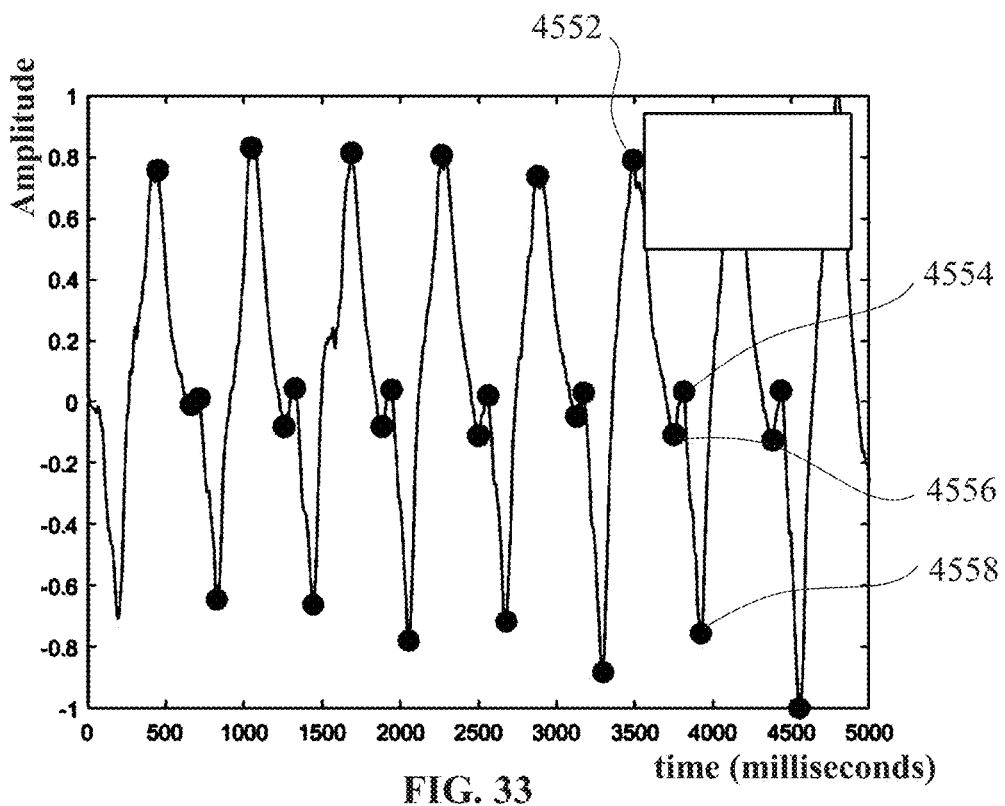
FIG. 33 is a pulse wave curve diagram from an example test subject obtained according to the device as shown in FIG. 27 and the method as shown in FIG. 28.

According to a specific example, the pulse wave of a 23-year-old healthy test subject obtained according to the technical solution as disclosed in this embodiment is shown in FIG. 33, in which the reference numeral 4452 represents the pulse wave peak, and 4454 represents the dicrotic wave peak, 4456 represents the trough of the dicrotic wave, and 4458 represents the trough of the pulse wave. According to the aforementioned method, the processed pulse wave characteristics (Features) of the test subject are: heart rate: 104; diastolic time ratio: 05720; double pulse wave relative height: 0.4443; contraction time ratio: 0.4280; double pulse wave Beat time: 0.243; relative height of notch: 0.3433. The input model is a 1×6 matrix, as shown in Table 4 below:

TABLE 4

| Example input vector values of the present embodiment | | | | | |
|---|---|---|---|---|---|
| 104 | 0.5720 | 0.4443 | 0.4280 | 0.243 | 0.3433 |

In the present embodiment, the results output of a certain test subject using the random forest model are compared with the actual values as shown in Table 5 below:

TABLE 5

Blood pressure values and results of a subject in the Example

|  | Diastolic blood pressure (mmHg) | Systolic blood pressure (mmHg) |
|---|---|---|
| Predictive value | 63 | 124 |
| actual value | 69 | 120 |
| absolute error | 6 | 4 |

In this example, the final experimental result of the measurement results of multiple instances is that the average absolute error of systolic blood pressure is 7.2 mm Hg, and the average absolute error of diastolic blood pressure is 6.3 mm Hg.

As mentioned above, the present example uses a single sensor to obtain the pulse wave signal of the test subject, extracts one or more pulse wave features, and uses machine learning methods to achieve non-contact measurement of systolic blood pressure and diastolic blood pressure respectively.

As used herein, the singular "a" and "an" may be construed to include the plural "one or more" unless expressly stated otherwise.

The present invention has been presented for the purposes of illustration and description, but is not intended to be exhaustive or limiting. Many modifications and variations will be apparent to those of ordinary skill in the art. The example embodiments were chosen and described in order to explain principles and practical application, and to enable others of ordinary skill in the art to understand the invention for various embodiments with various modifications as are suited to the particular use contemplated.

Accordingly, while illustrative example embodiments have been described herein with reference to the accompanying drawings, it should be understood that this description is not limiting and that various other changes and modifications may be made by those of ordinary skill in the art without departing from the scope of the present application.

The invention claimed is:

1. A vital sign detection device comprising:
a main body;
a plurality of sensors coupled to the main body, the plurality of sensors being configured to simultaneously detect a plurality of corresponding vital sign signals of a test subject;
a controller in data connection with the plurality of sensors; and
a first filter and a second filter,
wherein the controller being configured to receive the plurality of corresponding vital sign signals from the plurality of sensors, and to provide at least one vital sign information of the test subject based on at least one of the plurality of corresponding vital sign signals received,
the plurality of sensors includes a radar device and a video device;
the plurality of corresponding vital sign signals includes a first pulse wave signal and a second pulse wave signal;
the controller includes a radar signal processor coupled to the radar device and a video signal processor coupled to the video device;
the at least one vital sign information includes a blood pressure value;
wherein the radar device is configured to transmit a radar signal to the test subject and to receive a radar echoes from a first part of the test subject, and the radar signal processor being configured to extract the first pulse wave signal from the radar echoes;
the video device is configured to receive a video signal from a second part of the test subject, and the video signal processor being configured to extract the second pulse wave signal from the video signal stream;
the controller being configured to obtain a measured pulse wave transit time from the first pulse wave signal and the second pulse wave signal, and to match the measured pulse wave transit time with a reference pulse wave transit time to obtain the blood pressure value,
wherein the radar signal processor is further configured to demodulate in-phase signals and orthogonal signals in the radar echoes to obtain an initial radar signal, and to perform a phase compensation to the initial radar signal to obtain a complete radar signal,
wherein the radar signal processor being further configured to transform the complete radar signal from time domain to frequency domain to obtain a highest amplitude corresponding to a reference frequency; the first filter being configured to filter the complete radar signal to obtain the first pulse wave signal, wherein an upper bound frequency of the first filter is configured to vary based on the reference frequency,
wherein the video signal processor being further configured to: extract an original green channel signal from the video signal stream; remove interference signals from the original green channel signal to obtain a baseline-drift-eliminated green channel signal; set an interval upper bound of the second filter; filter the baseline-drift-eliminated green channel signal with the second filter to obtain the second pulse wave signal, wherein the interval upper bound of the second filter varies based on the reference frequency.

2. The detection device as recited in claim 1, wherein the controller being configured to obtain the at least one vital sign information of the test subject based on the plurality of corresponding vital sign signals.

3. The detection device as recited in claim 1, wherein the controller being configured to obtain a plurality of vital sign information of the test subject based on at least one vital sign signal.

4. The detection device as recited in claim 1, further comprising a human-machine interaction interface coupled to the controller, the human-machine interaction interface being configured to verify an identity information of the test subject, and to provide the at least one vital sign information corresponding to the identity information of the test subject to the test subject; a driving unit coupled to the controller, the main body being attached on the driving unit, the driving unit being configured to carry the main body to move between a plurality of preset detection positions; a position sensor and a proximity sensor coupled to the controller, wherein the controller being configured to activate the detection device to perform vital signs detection upon the position sensor determining that the detection device reaches any of the plurality of preset detection positions and upon the proximity sensor determining that the test subject is located at any one of the preset detection positions; and a communication device coupled to the controller, the communication device being configured to be communicably connectable with a remote end.

5. The detection device as recited in claim 1, further comprising a support portion movably coupled to the main body, wherein at least one sensor of the plurality of sensors is disposed to face the support portion; the support portion being movable relative to the main body between an open position and a closed position; in the open position, the support portion extends from the main body to form a receiving space between the support portion and the main body, the at least one sensor being configured to have a detection range covering the receiving space; in the closed position, the support portion retracts into the main body to collapse the receiving space.

6. The detection device as recited in claim 1, further comprising:
 a bearing frame having a first surface; a second surface opposite to the first surface; and a window through the first surface and the second surface;
 the radar device being fixed to a first position on a side of the bearing frame facing the first surface and spaced apart from the bearing frame, the radar device and the bearing frame forming an accommodating space for receiving the test subject on the first surface, the first position being spaced apart from the first part of the test subject such that the radar device transmits radar signals to the test subject and receives radar echoes from the first part of the test subject;
 the video device being fixed to a second position facing the second surface and spaced apart from the bearing frame, the second position being aligned with a second part of the test subject through the window such that the video device receives the video signal of the second part of the test subject through the window.

7. The device as recited in claim 1, wherein the controller is configured to extract at least one pulse wave characteristic value from the pulse wave signal and to obtain the blood pressure of the test subject based on the at least one pulse wave characteristic value.

8. The device as recited in claim 7, wherein the at least one pulse wave characteristic value includes: a contraction time proportion (t1/t), a double beat time (t4/t); a Diastolic time ratio (t2/t); a relative height of notch (h2/h1); a relative height of double pulse wave (h3/h1) and a heart rate, corresponding to the pulse wave signal.

9. The device as recited in claim 7, wherein to obtain the blood pressure value of the test subject according to at least one characteristic value includes: building a random forest model to obtain a reference data model, and obtaining a measured blood pressure value based on a characteristic value of a measured pulse wave.

10. A non-contact blood pressure measurement method comprising:
 receiving a radar echoes from a first part of a test subject;
 extracting a first pulse wave signal from the radar echoes;
 receiving a video signal stream of a second part of the test subject;
 extracting a second pulse wave signal from the video signal stream;
 obtaining a measured pulse wave transit time from the first pulse wave signal and the second pulse wave signal; and
 matching the measured pulse wave transit time with a reference pulse wave transit time to obtain a blood pressure value corresponding to the measured pulse wave transit time,
 wherein extracting the first pulse wave signal from the radar echoes comprises:
 demodulating in-phase signals and orthogonal signals in the radar echoes to obtain an initial radar signal;
 performing phase compensation on the initial radar signal to obtain a complete radar signal;
 performing a first filter filtering on the complete radar signal to obtain the first pulse wave signal,
 further comprising, prior to performing the first filter filtering on the complete radar signal:
 performing a Fourier transform on the complete radar signal to transform the complete radar signal from time domain to frequency domain to obtain a reference frequency corresponding to a highest amplitude,
 setting a first filter interval upper bound for filtering the complete radar signal, wherein the first filter interval upper bound varies based on the reference frequency,
 wherein extracting the second pulse wave signal from the video signal stream comprises:
 extracting an original green channel signal from the video signal stream;
 removing interference signals from the original green channel signal to obtain a baseline-drift-eliminated green signal;
 setting an interval upper bound of the second filter, wherein the interval upper bound of the second filter varies based on the reference frequency;
 filtering the baseline-drift-eliminated green channel through the second filter to obtain the second pulse wave signal.

11. The method as recited in claim 10, wherein removing interference signals from the original green channel signal further includes:
 extracting a signal strength value of an original green channel;
 subtracting from the signal strength value of the original green channel an average value of signal strength values of the green channel.

12. The method as recited in claim 10, wherein a distance between the first part and a pulse source of the test subject is smaller than a distance between the second part and the pulse source.

* * * * *